US 11,742,666 B2

(12) United States Patent
Hassan

(10) Patent No.: US 11,742,666 B2
(45) Date of Patent: Aug. 29, 2023

(54) METHOD FOR SYNCHRONIZING AN ACTIVE LOAD WITH A MICROGRID USING A PROPORTIONAL INTEGRAL CONTROLLER

(71) Applicant: KING FAHD UNIVERSITY OF PETROLEUM AND MINERALS, Dhahran (SA)

(72) Inventor: Mohammed Ali Ali Hassan, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 16/256,392

(22) Filed: Jan. 24, 2019

(65) Prior Publication Data

US 2020/0241489 A1 Jul. 30, 2020

(51) Int. Cl.
| | |
|---|---|
| G05B 13/04 | (2006.01) |
| H02J 3/38 | (2006.01) |
| H02J 3/40 | (2006.01) |
| H02J 3/06 | (2006.01) |
| H02J 3/46 | (2006.01) |

(52) U.S. Cl.
CPC ............ *H02J 3/381* (2013.01); *G05B 13/042* (2013.01); *H02J 3/06* (2013.01); *H02J 3/40* (2013.01); *H02J 3/46* (2013.01)

(58) Field of Classification Search
None
See application file for complete search history.

(56) References Cited

U.S. PATENT DOCUMENTS 9,680,364 B2 6/2017 Khajehoddin et al.
9,720,395 B2 8/2017 Shi et al.
(Continued)

FOREIGN PATENT DOCUMENTS

WO WO 2018/033721 A1 2/2018

OTHER PUBLICATIONS

Hassan et al. 'Optimal Design of Microgrids in Autonomous and Grid-Connected Modes Using Particle Swarm Optimization' IEEE Transactions on Power Electronics, vol. 26, No. 3, Mar. 2011.*
(Continued)

*Primary Examiner* — Bernard G Lindsay
(74) *Attorney, Agent, or Firm* — Oblon, McClelland, Maier & Neustadt, L.L.P.

(57) ABSTRACT

This disclosure presents a method, an apparatus, and a non-transitory computer readable medium to synchronize an active load with a microgrid having a plurality of distributed generators. The method comprises obtaining respective reference frames for the active load and each of the plurality of distributed generators. The method further comprises selecting the reference frame of a first distributed generator as a common reference frame for the microgrid. The method further comprises pooling the active load and the other distributed generators of the plurality of distributed generators on the common reference frame of the microgrid. The method further comprises tuning controller parameters of the active load and the plurality of distributed generators so that predefined grid voltage, frequency, and phase values of the microgrid are maintained.

8 Claims, 27 Drawing Sheets

(56) References Cited

U.S. PATENT DOCUMENTS

| | | | | |
|---|---|---|---|---|
| 2011/0248569 | A1* | 10/2011 | Son | H02J 3/381 |
| | | | | 307/87 |
| 2012/0259477 | A1* | 10/2012 | Abido | H02J 3/38 |
| | | | | 700/297 |
| 2016/0125103 | A1* | 5/2016 | Cracraft | G06N 3/006 |
| | | | | 703/2 |
| 2016/0134202 | A1* | 5/2016 | Lu | H02M 7/539 |
| | | | | 363/123 |
| 2019/0024634 | A1* | 1/2019 | Tarnowski | H02J 3/381 |
| 2019/0190274 | A1* | 6/2019 | Fazeli | H02J 7/35 |

OTHER PUBLICATIONS

Bottrell et al. 'Dynamic Stability of a Microgrid With an Active Load' IEEE Transactions on Power Electronics, vol. 28, No. 11, Nov. 2013.*

W. Bai, et al., "Distributed generation system control strategies with PV and fuel cell in microgrid operation" Control Engineering Practice, Feb. 2016, pp. 1-11.

* cited by examiner

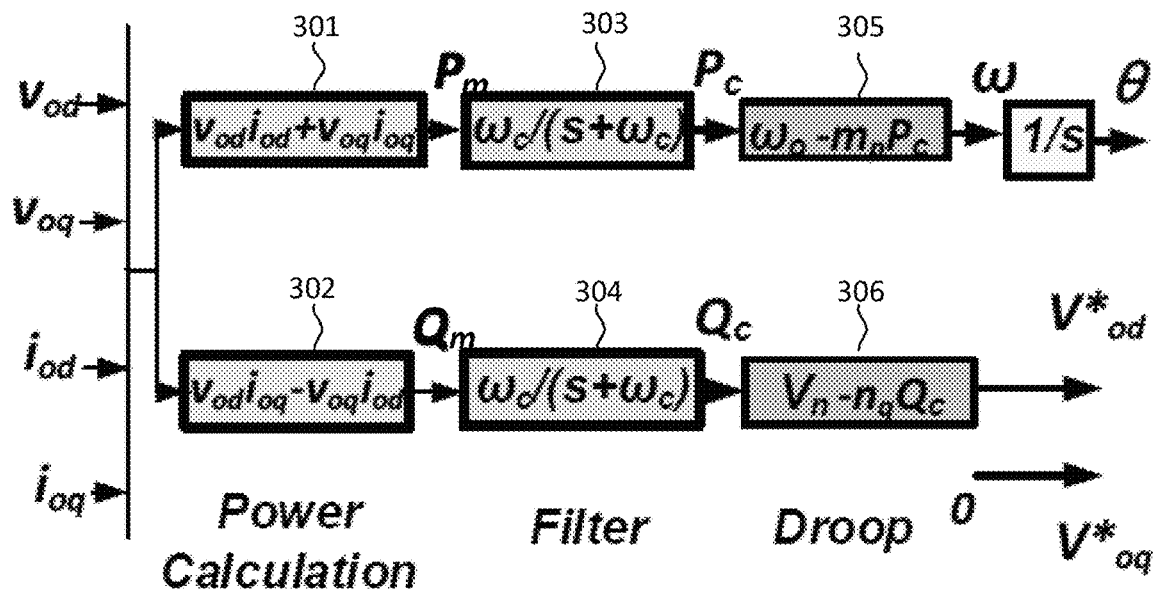
*FIG. 3A*
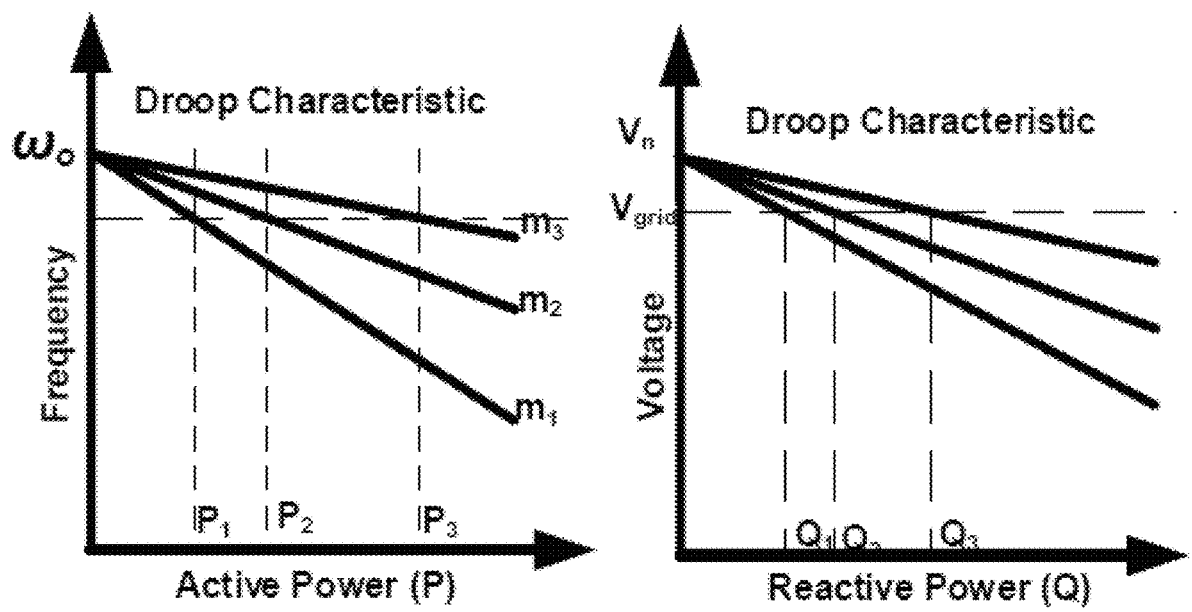
*FIG. 3B*  *FIG. 3C*

METHOD FOR SYNCHRONIZING AN ACTIVE LOAD WITH A MICROGRID USING A PROPORTIONAL INTEGRAL CONTROLLER

BACKGROUND

Technical Field

The present disclosure is directed to power electronics and systems, and more particularly, to microgrid synchronization.

Description of Related Arts

The "background" description provided herein is for the purpose of generally presenting the context of the disclosure. Work of the presently named inventors, to the extent it is described in this background section, as well as aspects of the description which may not otherwise qualify as prior arts at the time of filing, are neither expressly or impliedly admitted as prior arts against the present disclosure.

Due to global warming gas emissions reduction and different environmental issues, distributed generation (DG) resources such as photovoltaic arrays (PVs), wind, fuel cells, and biomass are being rapidly used in electric power utilities, as described by A. Colmenar-Santos et al. in "Distributed Generation: A Review of Factors that can Contribute most to Achieve a Scenario of DG Units Embedded in the New Distribution Networks" which was published on Renewable & Sustainable Energy Reviews, Vol. 59, pp. 1130-1148, 2016. Multiple DGs are coupled with different local loads such as constant impedance loads (CILs) and constant power loads (CPLs) at the distribution level to perform in a microgrid, as described by N. Hatziagyriou in "Microgrids: Architectures and Control" which was published by John Wiley & Sons, 2013, by T. Tran et al. in "PLL-Based Seamless Transfer Control Between Grid-Connected and Islanding Modes in Grid-Connected Inverters" which was published on IEEE Trans. Power Electronics, Vol. 29, No. 10, pp. 5218-5228, 2014, and by M. Hassan et al. in "Optimal Design of Microgrids in Autonomous and Grid-Connected Modes Using Particle Swarm Optimization" which was published on IEEE Transactions on Power Electronics, Vol. 26, No. 3, pp. 755-769, 2011.

Microgrid can operate either in island mode or in grid-connected mode, as described by N. Hatziagyriou in "Microgrids: Architectures and Control" (2013). In the grid-connected mode, a synchronization unit is employed to synchronize a phase of a load voltage to a grid voltage. Therefore, for an autonomous microgrid, the synchronization unit can generate an angle with a desired frequency, as described by T. Tran et al. in "PLL-Based Seamless Transfer Control Between Grid-Connected and Islanding Modes in Grid-Connected Inverters" (2014). In addition, a DG inverter is employed to provide a load with a predefined voltage and a predefined frequency, as described by M. Hassan et al. in "Optimal Design of Microgrids in Autonomous and Grid-Connected Modes Using Particle Swarm Optimization" (2011). In most cases, power controllers, current controllers, and voltage controllers are employed to control output power, output current, and output voltage of DG inverters, respectively.

Droop control scheme is also usually employed to share power among DG units in the autonomous microgrid, as described by M. Hassan et al. in "Optimal Design of Microgrids in Autonomous and Grid-Connected Modes Using Particle Swarm Optimization" (2011), and by H. Moussa et al. in "Optimal Angle Droop for Power Sharing Enhancement with Stability Improvement in Islanded Microgrids" which was published on IEEE Transactions on Smart Grid, Vol. 9, No. 5, pp. 5014-5026, 2018. Depending on droop operation, the magnitude and the frequency of the DG output voltage are varied. With any constant load perturbation, microgrid stability will be affected by the low inertia of the inverter-based DG units and then generate frequency deviations, as described by H. Moussa et al. in "Optimal Angle Droop for Power Sharing Enhancement with Stability Improvement in Islanded Microgrids" (2018).

Centralized and decentralized control schemes are used to improve and enhance the dynamic performance of the microgrids, as described by X. Guo et al. in "Dynamic Phasors-Based Modeling and Stability Analysis of Droop-Controlled Inverters for Microgrid Applications" which was published on IEEE Transactions on Smart Grid, Vol. 5, No. 6, pp. 2980-2987, 2014, by H. Liang et al. in "Stability Enhancement of Decentralized Inverter Control through Wireless Communications in Microgrids" which was published on IEEE Transactions on Smart Grid, Vol. 4, No. 4, pp. 321-31, 2013, by K. Tan et al. in "Centralized Control for Parallel Operation of Distributed Generation Inverters in Microgrids" which was published on IEEE Transactions on Smart Grid, Vol. 3, No. 4, pp. 1977-87, 2012, and by D. Olivares et al. in "Trends in Microgrid Control" which was published on IEEE Transactions on Smart Grid, Vol. 5, No. 4, pp. 1905-1919, 2014. In the decentralized schemes, new DG units can be integrated without changing the controller settings continuously. However, this type of controllers cannot manage operations with high levels of coordination, as described by X. Guo et al. in "Dynamic Phasors-Based Modeling and Stability Analysis of Droop-Controlled Inverters for Microgrid Applications" (2014), and by H. Liang et al. in "Stability Enhancement of Decentralized Inverter Control through Wireless Communications in Microgrids" (2013). On the other hand, the system optimization can be done using the centralized control schemes, but the desirable plug-and-play feature cannot be revealed, as described by K. Tan et al. in "Centralized Control for Parallel Operation of Distributed Generation Inverters in Microgrids" (2012). The advantages and disadvantages of both schemes were summarized by D. Olivares et al. in "Trends in Microgrid Control" (2014).

The microgrid stability is significantly affected by load dynamics, as described by M. Hassan et al. in "Optimal Design of Microgrids in Autonomous and Grid-Connected Modes Using Particle Swarm Optimization" (2011). The effect of the passive load dynamics was reported by M. Kent et al. in "Dynamic Modeling of Loads in Stability Studies" which was published on IEEE Trans. Power App. Syst., Vol. PAS-88, No. 5, pp. 756-763, 1969. It was reported that the power sharing controller parameters and load demand dominantly affect the low frequency modes while the inner voltage controller parameters, current controller parameters, filter components, and load dynamics have more effects on the damped medium and high frequency modes, as described by G. Ding et al. in "Control of Distributed Generation and Power Electronics Loads in Microgrid" which was published on International Conference on Advanced Mechatronic Systems, Melbourne, Australia, pp. 68-72, 2016. Therefore, the controller parameters and power sharing parameters should be adapted to enhance the dynamic performance of the autonomous microgrid, especially when CILs are included, as described by M. Hassan et al. in "Optimal Design of Microgrids in Autonomous and Grid-Connected Modes Using Particle Swarm Optimization" (2011).

Previous studies show that fixed-gain proportional integral (PI) controllers cannot easily acclimate to load changes and disturbances even with parameters variation, especially in large microgrids. Therefore, a continuous tuning process is employed to adjust the controller gains to overcome these problems, as described by S. Seidi Khorramabadi et al. in "Critic-Based Self-Tuning PI Structure for Active and Reactive Power Control of VSCs in Microgrid Systems" which was published on IEEE Transactions on Smart Grid, Vol. 6, No. 1, pp. 92-103, 2015. With significant drawbacks such as falling to obtain the optimal settings and time-consuming, different trial and error approaches have been reported by X. Guo et al. in "Dynamic Phasors-Based Modeling and Stability Analysis of Droop-Controlled Inverters for Microgrid Applications" (2014), by H. Liang et al. in "Stability Enhancement of Decentralized Inverter Control through Wireless Communications in Microgrids" (2013), by K. Tan et al. in "Centralized Control for Parallel Operation of Distributed Generation Inverters in Microgrids" (2012), by D. Olivares et al. in "Trends in Microgrid Control" (2014), by M. Kent et al. in "Dynamic Modeling of Loads in Stability Studies" (1969), by G. Ding et al. in "Control of Distributed Generation and Power Electronics Loads in Microgrid" (2016), by S. Seidi Khorramabadi et al. in "Critic-Based Self-Tuning PI Structure for Active and Reactive Power Control of VSCs in Microgrid Systems" (2015), and by E. Raju P et al. in "Robust Optimal Centralized Controller to Mitigate the Small Signal Instability in an Islanded Inverter Based. Microgrid with Active and Passive Loads" which was published on International Journal of Electrical Power & Energy Systems, Vol. 90, pp. 225-236, 2017.

Recently, in addition to classical approaches, computational intelligence algorithms such artificial neural networks, fuzzy logic, and particle swarm optimization (PSO) have been applied to solve many power system problems with remarkable success, as described by M. Moafi et al. in "Energy Management System Based on Fuzzy Fractional Order PID Controller for Transient Stability Improvement in Microgrids with Energy Storage" which was published on International Transactions on Electrical Energy Systems, Vol. 26, No. 10, pp. 2087-2106, 2016. Although most of these algorithms increase the control system complexity, researchers have used these algorithms to improve the transient performance of the microgrid. As one of the promising optimization technique, PSO has been widely implemented since it has many advantages such as robustness, simplicity, computational efficiency, and enhancing the global and local exploration abilities, as described by J. Kennedy et al. in "Particle Swarm Optimization" which was published on Proc. IEEE Int. Conf. Neural Network, Perth, Australia, 1995, pp. 1942-1948, by M. Abido in "Optimal Design of Power-System Stabilizers Using Particle Swarm Optimization" which was published on IEEE Trans. Energy Conversion, Vol. 17, No. 3, pp. 406-413, 2002. It is worth mentioning that PSO is used as an efficient tool for optimization that gives a balance between local and global search techniques.

Nowadays, CPLs have been recently used for several DC applications such as computer power supplies, telecom power stations satellites and other space systems, and AC distribution power systems like electric ships, electric vehicles and microgrids, as described by A. Emadi et al. in "Constant Power Loads and Negative Impedance Instability in Automotive Systems: Definition, Modeling, Stability, and Control of Power Electronic Converters and Motor Drives" which was published on IEEE Trans. Veh. Technol., Vol. 55, No. 4, pp. 1112-1125, 2006, by N. Bottrell et al. in "Dynamic Stability of a Microgrid with an Active Load" which was published on IEEE Trans. Power Electron., Vol. 28, No. 11, pp. 5107-5119, 2013, by X. Liu et al. in "Stability Criteria for Constant Power Loads with Multistage Filters" which was published on IEEE Transactions on Vehicular Technology, Vol. 60, pp. 2042-2049, 2011, by A. Mahmoudi et al. in "A New Linear Model for Active Loads in Islanded Inverter-Based Microgrid" which was published on International Journal of Electrical Power and Energy Systems, Vol. 81, pp. 104-113, 2016, by P. Magne et al. in "Dynamic Consideration of DC Microgrids with Constant Power Loads and Active Damping System: A Design Method for Fault-Tolerant Stabilizing System" which was published on IEEE Journal of Emerging and Selected Topics in Power Electronics, Vol. 2, pp. 562-570, 2014, by S. Sanchez et al. in "Conditions for Existence of Equilibria of Systems with Constant Power Loads" which was published on IEEE Transactions on Circuits and Systems I: Regular Papers, Vol. 61, pp. 2204-2211, 2014, by D. Marx et al. in "Large Signal Stability Analysis Tools in DC Power Systems with Constant Power Loads and Variable Power Loads: A Review" which was published on IEEE Transactions on Power Electronics, Vol. 27, pp. 1773-1787, 2012, by W. Du et al. in "Stability Criterion for Cascaded System with Constant Power Load" which was published on IEEE Trans. Power Electron, vol. 28, no. 4, pp. 1843-1851, 2013, by C. Onwuchekwa et al. in "Analysis of Boundary Control for Buck Converters with Instantaneous Constant-Power Loads" which was published on IEEE Trans. Power Electron., Vol. 25, No. 7, pp. 2018-2032, 2010, by Dena Karimipour et al. in "Stability Analysis of AC Microgrids With Constant Power Loads Based on Popov's Absolute Stability Criterion" which was published on IEEE Trans. Circuits and Systems II, Vol. 62, No. 7, pp. 696-700, 2015, and by A. Luna et al. in "Grid Voltage Synchronization for Distributed Generation Systems under Grid Fault Conditions" which was published on IEEE Trans. Ind. Appl., Vol. 51, No. 4, pp. 1-13, 2015.

Most of the CPLs utilize a frontend rectifier to control the DC load voltage where the whole rectifier with its DC load appears to the utility as CPLs, as described by A. Emadi et al. in "Constant Power Loads and Negative Impedance Instability in Automotive Systems: Definition, Modeling, Stability, and Control of Power Electronic Converters and Motor Drives" (2006). CPLs have two important characteristics: negative incremental resistance and control loop dynamic with similar frequency range of the inverter, as described by N. Bottrell et al. in "Dynamic Stability of a Microgrid with an Active Load" (2013). Negative incremental resistance means that any increase in the current will be followed by voltage decrease so that the power will remain constant. The negative resistance property and the interaction between the DGs and the CPLs reduce the system damping and lead to instability or unacceptable oscillatory responses, as described by A. Emadi et al. in "Constant Power Loads and Negative Impedance Instability in Automotive Systems: Definition, Modeling, Stability, and Control of Power Electronic Converters and Motor Drives" (2006). In addition, the interaction between the dynamics of the generation units and the dynamics of the corresponding loads is very important to be studied, as described by N. Bottrell et al. in "Dynamic Stability of a Microgrid with an Active Load" (2013). Therefore, stability analysis for microgrid with CPLs has been recently concerned, as described by X. Liu et al. in "Stability Criteria for Constant Power Loads with Multistage Filters" (2011), by A. Mahmoudi et al. in "A New Linear Model for Active Loads in Islanded Inverter-Based Microgrid" (2016), by P. Magne et al. in "Dynamic Consideration of DC Microgrids with Constant Power Loads and Active Damping System: A Design Method for Fault-Tolerant Stabilizing System" (2014), by S. Sanchez et al. in "Conditions for Existence of Equilibria of Systems with Constant Power Loads" (2014), by D. Marx et al. in "Large Signal Stability Analysis Tools in DC Power Systems with Constant Power Loads and Variable Power Loads: A Review" (2012), by W. Du et al. in "Stability Criterion for Cascaded System with Constant Power Load" (2013), by C. Onwuchekwa et al. in "Analysis of Boundary Control for Buck Converters with Instantaneous Constant-Power Loads" (2010), and by Dena Karimipour et al. in "Stability Analysis of AC Microgrids With Constant Power Loads Based on Popov's Absolute Stability Criterion" (2015).

Some researchers have used the linearization techniques and have utilized linear classical tools such as eigenvalue analysis and frequency-domain techniques recently. However, these linearized techniques are valid only in close proximity to the equilibrium point, as described by A. Mahmoudi et al. in "A New Linear Model for Active Loads in Islanded Inverter-Based Microgrid" (2016), and by P. Magne et al. in "Dynamic Consideration of DC Microgrids with Constant Power Loads and Active Damping System: A Design Method for Fault-Tolerant Stabilizing System" (2014). Other researchers have used the large-signal analysis to investigate the microgrid stability including CPLs, as described by S. Sanchez et al. in "Conditions for Existence of Equilibria of Systems with Constant Power Loads" (2014), by D. Marx et al. in "Large Signal Stability Analysis Tools in DC Power Systems with Constant Power Loads and Variable Power Loads: A Review" (2012), by W. Du et al. in "Stability Criterion for Cascaded System with Constant Power Load" (2013), and by C. Onwuchekwa et al. in "Analysis of Boundary Control for Buck Converters with Instantaneous Constant-Power Loads" (2010).

Large-signal stability properties were studied using Brayton-Moser's mixed potential theory to estimate the boundary of region of attraction, as described by S. Sanchez et al. in "Conditions for Existence of Equilibria of Systems with Constant Power Loads" (2014), by D. Marx et al. in "Large Signal Stability Analysis Tools in DC Power Systems with Constant Power Loads and Variable Power Loads: A Review" (2012), and by W. Du et al. in "Stability Criterion for Cascaded System with Constant Power Load" (2013). Additionally, large-signal stability was analyzed using a first-order switching surface, as described by C. Onwuchekwa et al. in "Analysis of Boundary Control for Buck Converters with Instantaneous Constant-Power Loads" (2010). Meanwhile, the graphical approach and phase plane analysis were used to estimate the basin of attraction of equilibrium point to examine the microgrid stability including CPLs, as described by A. Emadi et al. in "Constant Power Loads and Negative Impedance Instability in Automotive Systems: Definition, Modeling, Stability, and Control of Power Electronic Converters and Motor Drives" (2006). However, this technique cannot be generalized because the phase portrait depends on system parameters. Additionally, due to the nonlinear nature of CPLs, linear tools are not enough to study the microgrid stability in the presence of CPLs. As described by Dena Karimipour et al. in "Stability Analysis of AC Microgrids with Constant Power Loads Based on Popov's Absolute Stability Criterion" (2015), the stability conditions of a microgrid including CPLs were analyzed using Popov's absolute stability theorem. It is most important to keep active load synchronized with the microgrid because the DG inverter has to feed active load by the right amount of power on the right time, as described by A. Luna et al. in "Grid Voltage Synchronization for Distributed Generation Systems under Grid Fault Conditions" (2015). Therefore, a synchronization unit has to be added to synchronize an active load with a microgrid, as described by N. Bottrell et al. in "Dynamic Stability of a Microgrid with an Active Load" (2013). The synchronization unit is used to extract the phase angle of the grid voltage and track the microgrid frequency. It delivers the reference voltage for the power converter by providing the converter by the frequency and the amplitude of the fundamental component of the grid voltage. A phase locked loop (PLL) is a common technique used for phase tracking, as described by A. Luna et al. in "Grid Voltage Synchronization for Distributed Generation Systems under Grid Fault Conditions (2015), by D. Dong et al. in "Analysis of Phase-Locked Loop Low Frequency Stability in Three-Phase Grid-Connected Power Converters Considering Impedance Interactions" which was published on IEEE Trans. Ind. Electron., Vol. 62, No. 1, pp. 310-321, 2015, by J. Svensson in "Synchronization Methods for Grid-Connected Voltage Source Converter" which was published on IEE Proc.-Generation, Transmission and Distribution, Vol. 148, No. 3, pp. 229-235, 2001, and by D. Yazdani et al. in "Grid Synchronization Techniques for Converter Interfaced Distributed Generation Systems" which was published on IEEE Energy Conversion Congress and Exposition, San Jose, Calif., USA, 2007-2014, Sep. 20-24, 2009.

However, PLL has a negative impact on the control performance, as described by D. Dong et al. in "Analysis of Phase-Locked Loop Low Frequency Stability in Three-Phase Grid-Connected Power Converters Considering Impedance Interactions" (2015). It is not fast enough with acceptable accuracy. Meanwhile, it takes time for the power controllers and voltage controllers to track the references provided by the PLL as well. Additionally, to attain an adequate performance, it is very difficult to tune the PLL parameters especially with the nonlinearity of PLL and inverter controller, as described by J. Svensson in "Synchronization Methods for Grid-Connected Voltage Source Converter" (2001). The coupling effect and interactions between the PLL itself and the system impedance network may also be considered because PLL could lead to a potential instability issue when multiple inverters are coupled together, as described by D. Yazdani et al. in "Grid Synchronization Techniques for Converter Interfaced Distributed Generation Systems" (2009). Therefore, removing PLL from the system can overcome the aforementioned problems and improve the microgrid performance.

SUMMARY

This disclosure presents a method, an apparatus, and a non-transitory computer readable medium to synchronize an active load with a microgrid having a plurality of distributed generators. An autonomous microgrid model with an active load is presented. Power, current, and voltage controllers have been used to control the DC voltage and AC current of the active load. Additionally, the dynamic stability of an autonomous microgrid with an active load is investigated. Optimal design of the controller parameters of the active load and the DG inverters is performed. The control problem is optimally designed based on minimizing a weighted objective function to limit the error in the DC voltage and the measured active power. Different step change disturbances are applied to verify and assess the impact of the optimal parameters of the power sharing, DG inverters, and active load controllers on the stability of the microgrid. The microgrid and active load performances with their proposed optimal controllers under the given disturbances have been tested. The microgrid performance is examined without PLL. The system is checked.

In an embodiment, a method for synchronizing an active load with a microgrid having a plurality of distributed generators comprises obtaining respective reference frames for the active load and each of the plurality of distributed generators, selecting the reference frame of a first distributed generator as a common reference frame for the microgrid, pooling the active load and the other distributed generators of the plurality of distributed generators on the common reference frame of the microgrid, and tuning controller parameters of the active load and the plurality of distributed generators so that predefined grid voltage, frequency, and phase values of the microgrid are maintained.

In another embodiment, an apparatus for synchronizing an active load with a microgrid having a plurality of distributed generators comprises a processing circuitry configured to obtain respective reference frames for the active load and each of the plurality of distributed generators, select the reference frame of a first distributed generator as a common reference frame for the microgrid, pool the active load and the other distributed generators of the plurality of distributed generators on the common reference frame of the microgrid, and tune controller parameters of the active load and the plurality of distributed generators so that predefined grid voltage, frequency, and phase values of the microgrid are maintained.

In another embodiment, a non-transitory computer readable medium storing computer-readable instructions therein which, when executed by a computer cause the computer to perform a method for synchronizing an active load with a microgrid having a plurality of distributed generators, the method comprising obtaining respective reference frames for the active load and each of the plurality of distributed generators, selecting the reference frame of a first distributed generator as a common reference frame for the microgrid, pooling the active load and the other distributed generators of the plurality of distributed generators on the common reference frame of the microgrid, and tuning controller parameters of the active load and the plurality of distributed generators so that predefined grid voltage, frequency, and phase values of the microgrid are maintained.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A shows an exemplary operation of a power controller used in a DG module of the autonomous microgrid 100, according to certain embodiments;

FIG. 3B show the P-ω droop characteristic of the exemplary power controller in FIG. 3A, according to certain embodiments;

FIG. 3C shows the Q-V droop characteristic of the exemplary power controller in FIG. 3A, according to certain embodiments;

DETAILED DESCRIPTION

Figure 1:
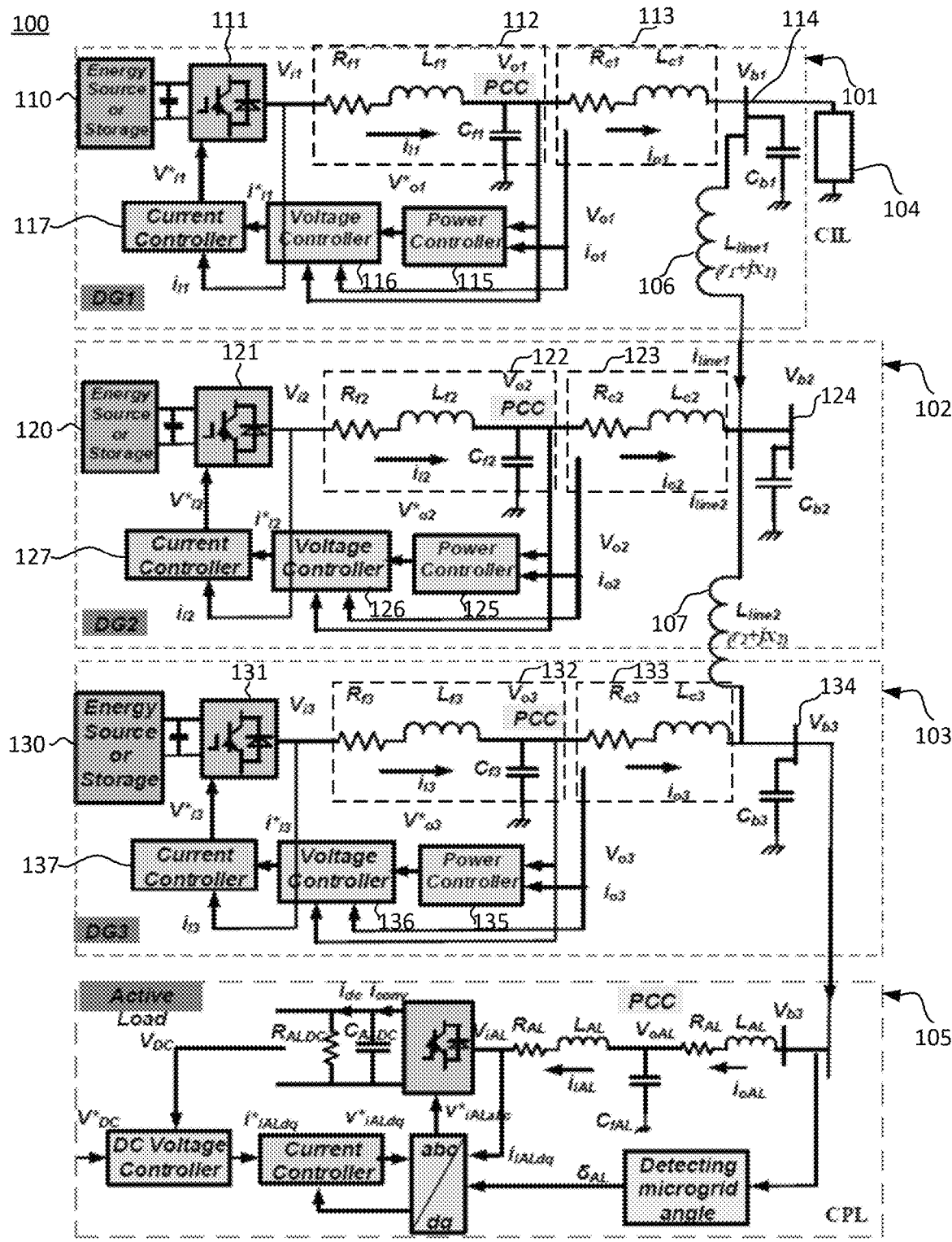
FIG. 1 illustrates a simplified schematic circuit diagram which shows an exemplary autonomous microgrid 100, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values there between.

Aspects of this disclosure are directed to a system, device, and method for synchronizing an active load with a microgrid having a plurality of distributed generators. The generalized concept of the present disclosure, with suitable modifications, is applicable to various synchronization systems, devices, methods for synchronizing an active load with a microgrid. The present disclosure will be described in detail herein with reference to the exemplary and preferred embodiments of synchronizing an active load with a microgrid having a plurality of distributed generators, although the disclosure is not necessarily limited to such topologies.

FIG. 1 illustrates a simplified schematic circuit diagram which shows an exemplary autonomous microgrid 100, according to certain embodiments. The autonomous microgrid 100 includes three DG modules 101-103 and two loads (constant impedance load, referred to as CIL 104, and constant power impedance, referred to as CPL 105). It is noted that although FIG. 1 only shows three DG modules and two loads, other numbers of DG modules and/or loads can be included into an autonomous microgrid, such as three DG modules and three loads. Generally, an autonomous microgrid can be expanded so that any number of DG modules and/or any number of active loads can be added.

In the FIG. 1 example, the DG module 101 is coupled to the DG module 102 through a transmission line $L_{line1}$ 106, and the DG module 102 is coupled to the DG module 103 through another transmission line $L_{line2}$ 107. The CIL 104 is coupled to the DG module 101 through a bus 114, and the CPL 105 is coupled to the DG module 103 through another switch 134.

In an embodiment, each DG module consists of at least one DG unit, one switching bridge, one low pass filter, one coupling inductor, one switch, one current controller, one voltage controller, and one power controller. Taking the DG module 101 as an example, as shown in FIG. 1, the DG module 101 includes a DG unit 110, a switching bridge 111, a low pass filter 112, a coupling inductor 113, a bus 114, a power controller 115, a voltage controller 116, and a current controller 117. The DG unit 110 is coupled to the low pass filter 112 through the switching bridge 111. The output voltage Vi1 of the switching bridge 111 is referred to as the inverter voltage of a DG1 inverter. In an example, a DG inverter is a three phase voltage source inverter (VSI) consisting of three legs with each leg corresponding to one of three phases. Each leg includes two switches connecting in series and each switch of two switches of each leg is connected in parallel with a diode. The switches of any leg of the inverter cannot be switched on simultaneously because it would result in short circuit across a DC unit. Similarly, the switches of any leg of the inverter cannot be switched off simultaneously to in order to avoid undefined states in the VSI and thus undefined ac output line voltages. The low pass filter 112 includes a filter resistance $R_{fl}$ and a filter inductance $L_{fl}$ as well as a filter capacitance $C_{fl}$. The current $i_{ll}$ is referred to as the filter inductor current. The output of the low pass filter 112 is referred to as a point of common coupling (PCC), and is coupled to the CIL 104 through the coupling inductor 113 and the bus 114. The output voltage $V_{o1}$ and output current $i_{o1}$ of the low pass filter 112 are referred to as the inverter output voltage and inverter output current of the DG1 inverter, respectively. The coupling inductor 113 includes a resistance $R_{cl}$ and an inductance $L_{cl}$. The power controller 115 detects the output power at PCC in order to control the frequency and the voltage of the autonomous microgrid 100 by adjusting the output power at PCC to keep the power balance and sharing in the microgrid. Its detailed operation is described in the following paragraphs with reference to FIGS. 3A-3C. The output voltage $V^*_{o1}$, of the power controller 115 is referred to as the reference output voltage and fed into the voltage controller 116 followed by the current controller 117. The output current $i^*_{ll}$ of the voltage controller 116 is referred to as filter inductor reference current and fed into the current controller 117. The input of the current controller 117 includes both the coupling inductor current $i_{ll}$ and inductor reference current $i^*_{ll}$. The output voltage $V^*_{l1}$ of the current controller 117 is referred to as the reference inverter voltage of the DG1 inverter and fed back into the switching bridge 111. The voltage controller 116 and the current controller 117 are used to control the output voltage and output current of the DG1 inverter, and will be described in details in the following paragraphs with reference to FIGS. 4A-4B. The CPL 105 may use a synchronization unit to synchronize the active load with the autonomous microgrid and its detailed operation will be described in the following paragraphs with reference to FIG. 5.

Similar to the DG module 101, each of the DG modules 102-103 consists of at least one DG unit, one switching bridge, one low pass filter, one coupling inductor, one switch, one current controller, one voltage controller, and one power controller. Both the DG modules 102-103 operate the same as or similarly as the DG module 101. Therefore, the detailed description of both the DG modules 102-103 will be omitted in the following paragraphs and can be referenced to the operation of the DG module 101. It is noted that each of the DG modules may generate different output power because the frequency and/or the phase of the output voltage/current of the DG modules may not be same.

Figure 2:
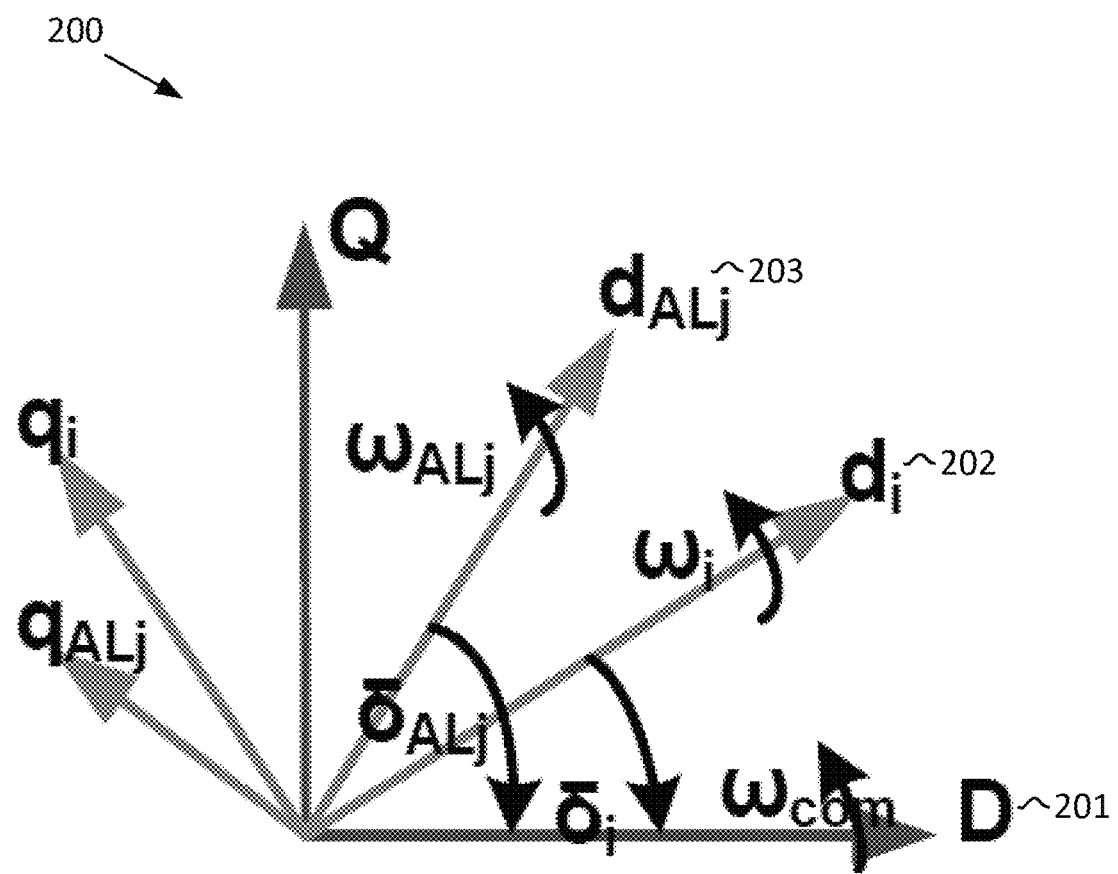
FIG. 2 shows a load flow analysis diagram 200 for the exemplary autonomous microgrid 100, according to certain embodiments.

FIG. 2 shows a load flow analysis diagram 200 for the exemplary autonomous microgrid 100, according to certain embodiments. In an embodiment, one or more dq reference frames may be used for the load flow analysis. In such an embodiment, the buses voltage and their angles given in FIG. 1 are used to create dq reference frames with rotating frequencies. In the load flow analysis, each of the DG modules and the active loads has its own and local reference frame, and one of these local reference frames can be selected as a common reference frame (DQ) for the whole microgrid.

In the FIG. 2 example, the reference frame of the DG1 module is selected as the common reference frame (DQ) 201. That is to say, the DG1 module bus is selected as a reference/slack bus. After modeling each inverter and each active load on its local dq reference frame, they are pooled onto the common reference frame (DQ). Accordingly, each of other DG modules and the active loads rotates at a corresponding angle based on an angle difference between its angle and the angle of the common reference frame (DQ).

As shown in FIG. 2, the (DQ) axis set represents the common reference frame with a rotating frequency $\omega_{com}$, the $(d_i\text{-}q_i)$ axis set 202 represents the reference frame of the $i^{th}$ inverter with a rotating frequency $\omega_i$, and the $(d_{ALj}\text{-}q_{ALj})$ axis set 203 represents the reference frame of the $j^{th}$ active load with a rotating frequency $\omega_{ALj}$. In addition, $\delta_i$ represents the angle between the reference frame of the $i^{th}$ inverter $(d_i\text{-}q_i)$ and the common reference frame (DQ) while $\delta_{ALj}$ represents the angle between the $j^{th}$ active load reference frame $(d_{ALj}\text{-}q_{ALj})$ and the common reference frame (DQ).

FIG. 3A shows an exemplary operation of a power controller used in a DG module of the autonomous microgrid 100, according to certain embodiments. In the FIG. 1 example, the power controller can be one of the power controllers 115, 125, and 135. The input of the power controller is the inverter output power (i.e., the inverter output voltage $v_o$ and the inverter output current $i_o$) at PCC. If a local dq reference frame is used for the DG module, $v_{od}$ and $v_{oq}$ are the d-component and q-component of the inverter output voltage $v_o$, respectively, while $i_{od}$ and $i_{oq}$ are the d-component and q-component of the inverter output current $i_o$, respectively. Accordingly, the instantaneous real and reactive powers ($P_m$ and $Q_m$) at PCC can be obtained by the power calculation blocks 301 and 302 as:

$$P_m = v_{od}i_{od} + v_{oq}i_{oq}$$

$$Q_m = v_{od}i_{oq} - v_{oq}i_{od} \quad (1)$$

where $P_m$ and $Q_m$ are the measured active and reactive powers, respectively.

In an embodiment, the d-component $v_{od}$ of the inverter output voltage is set to be the magnitude $|v_{od}|$ of the inverter output voltage while the q-component of the inverter output voltage is set to be zero in the local reference frame. Then the dq components of the inverter output currents can be obtained using Kirchhoff's voltage and current laws. Similarly, the dq components of the voltage at the active load bus can be obtained.

The power calculation blocks 301 and 302 are followed by two low pass filters 303 and 304, respectively. After the instantaneous real and reactive powers ($P_m$ and $Q_m$) at PCC are calculated, the average real and reactive powers ($P_c$ & $Q_c$) can be obtained by the low pass filters 303 and 304 as:

$$P_c = \frac{\omega_c}{\omega_c + s}P_m, \quad Q_c = \frac{\omega_c}{\omega_c + s}Q_m \quad (2)$$

where $\omega_c$ is the cut-off frequency of the low pass filters.

The low pass filters 303 and 304 are followed by two power droop controllers 305 and 306, respectively. The power droop controllers are used to control the frequency and the voltage of the autonomous microgrid. Equation (3) explains how the microgrid frequency $\omega$ and the d-axis reference output voltage $v^*_{od}$ can be controlled using the droop control scheme.

$$\omega = \omega_n - m_p P_c, \quad \dot\theta = \omega$$

$$v^*_{od} = V_n - n_q Q_c, \quad v^*_{oq} = 0 \quad (3)$$

where $\omega_n$ is the nominal angular frequency of a DG unit, $V_n$ is the nominal magnitude of the DG voltage and $m_p$ and $n_q$ are the droop controller gains. FIG. 3B and FIG. 3C show the P-$\omega$ droop characteristic and the Q-V droop characteristic of the exemplary power controller in FIG. 3A, respectively.

Figure 4A:
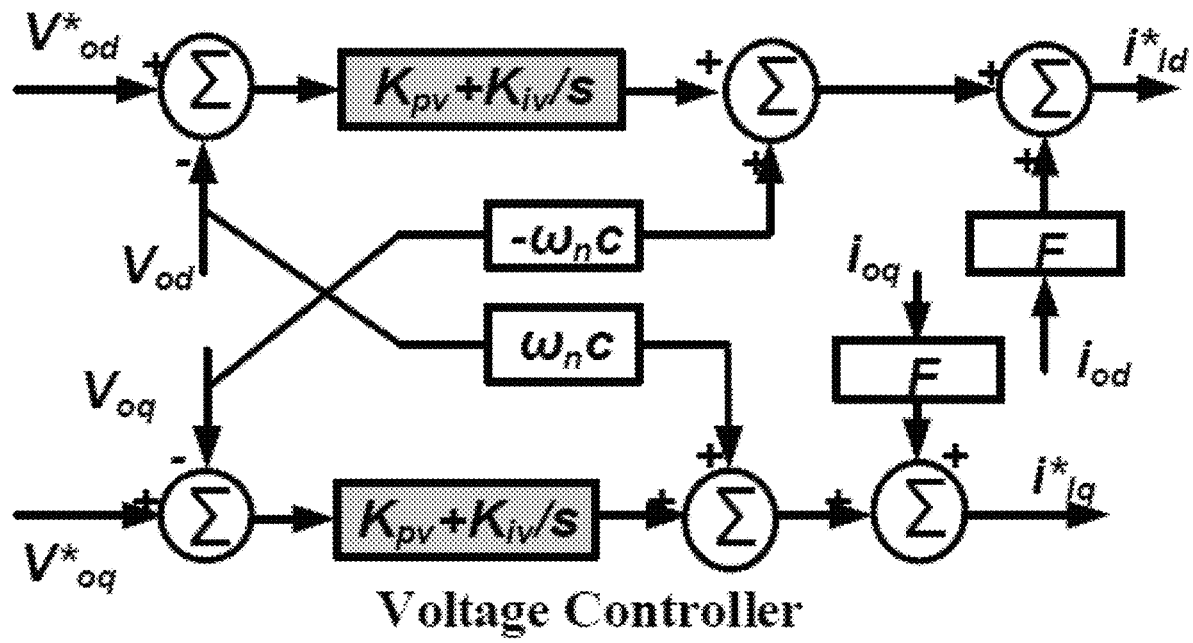
FIG. 4A shows an exemplary operation of a voltage controller used in a DG module of the autonomous microgrid 100, according to certain embodiments.
Figure 4B:
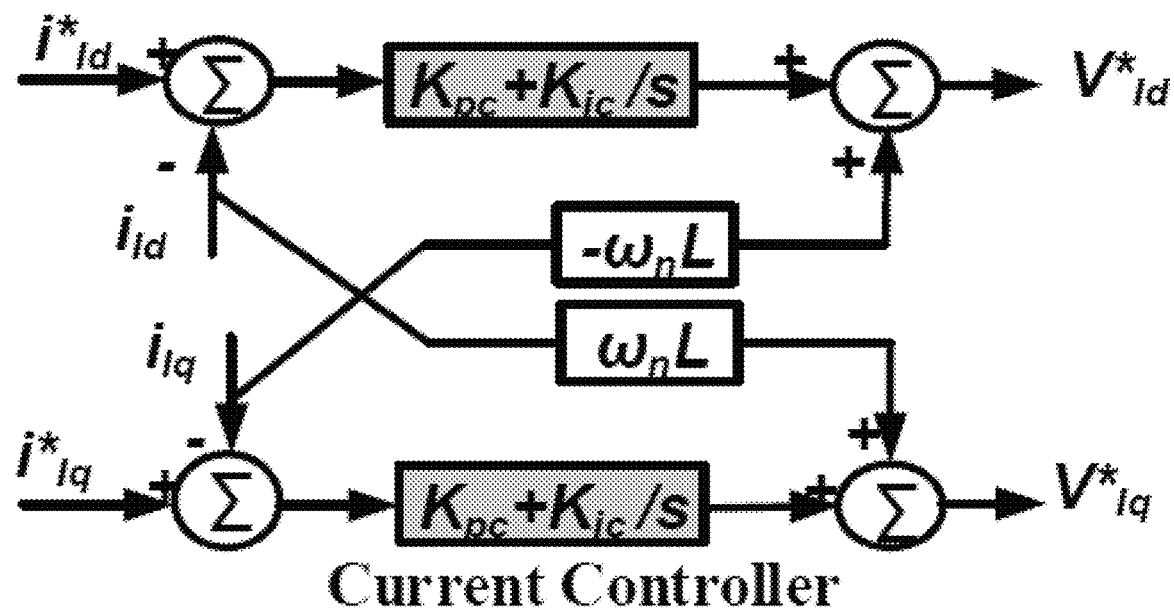
FIG. 4B shows an exemplary operation of a current controller used in a DG module of the autonomous microgrid 100, according to certain embodiments.

FIGS. 4A and 4B show exemplary operations of a voltage controller and a current controller used in a DG module of the autonomous microgrid 100, respectively. In the FIG. 1 example, the voltage controller can be one of the voltage controllers 116, 126, and 136, while the current controller can be one of the current controllers 117, 127, and 137.

The state equations of the voltage controller are written as:

$$i^*_{ld} = Fi_{od} - \omega_n C_f v_{oq} + K_{pv}(v^*_{od} - v_{od}) + K_{iv}\int(v^*_{od} - v_{od})dt$$

$$i^*_{lq} = Fi_{oq} + \omega_n C_f v_{od} + K_{pv}(v^*_{oq} - v_{oq}) + K_{iv}\int(v^*_{oq} - v_{oq})dt \quad (4)$$

where $i^*_{ld}$ and $i^*_{lq}$ are the dq components of the filter inductor reference current, $v^*_{od}$ and $v^*_{oq}$ are the dq components of the reference output voltage, F is the voltage controller feed-forward gain, $C_f$ is the filter capacitance, and $K_{pv}$ and $K_{iv}$ are the PI voltage controller parameters of the DG inverter, To emulate a voltage source and its output impedance, feed-forward terms are involved, as described by M. Hassan et al, (2011).

The state equations of the current controller are written as:

$$v^*_{id} = -\omega_n L_f i_{lq} + K_{pc}(i^*_{ld} - i_{ld}) + K_{ic}\int(i^*_{ld} - i_{ld})dt$$

$$v^*_{iq} = \omega_n L_f i_{ld} + K_{pc}(i^*_{lq} - i_{lq}) + K_{ic}\int(i^*_{lq} - i_{lq})dt \quad (5)$$

where $v^*_{id}$ and $v^*_{iq}$ are the dq components of the reference inverter voltage, $i^*_{ld}$ and $i^*_{ld}$ are the dq components of filter inductor reference current, $L_f$ is the filter inductance, and $K_{pc}$ and $K_{ic}$ are the PI current controller parameters of the DG inverter.

In addition, the state equations of a low pass filter are written as:

$$\frac{di_{ld}}{dt} = -\frac{r_f}{L_f}i_{ld} + \omega i_{lq} + \frac{1}{L_f}(v_{id} - v_{od})$$

$$\frac{di_{lq}}{dt} = -\frac{r_f}{L_f}i_{lq} - \omega i_{ld} + \frac{1}{L_f}(v_{iq} - v_{oq}) \quad (6)$$

where $i_{ld}$ and $i_{lq}$ are the dq components of the filter inductor current ($i_L$) and $r_f$ is a filter resistance of the low pass filter. In the FIG. 1 example, the low pass filter can be one of the low pass filters 112, 122, and 132.

The state equations of a coupling inductor are written as:

$$\frac{dv_{od}}{dt} = \omega v_{oq} + \frac{1}{C_f}(i_{ld} - i_{od}) \quad (7)$$

$$\frac{dv_{oq}}{dt} = -\omega v_{od} + \frac{1}{C_f}(i_{lq} - i_{oq})$$

$$\frac{di_{od}}{dt} = -\frac{r_c}{L_c}i_{od} + \omega i_{oq} + \frac{1}{L_c}(v_{od} - v_{bd}) \quad (8)$$

$$\frac{di_{oq}}{dt} = -\frac{r_c}{L_c}i_{oq} - \omega i_{od} + \frac{1}{L_c}(v_{oq} - v_{bq})$$

where $L_c$ and $r_c$ are the inductance and resistance of the coupling inductor, respectively. In the FIG. 1 example, the coupling inductor can be one of the coupling inductors 113, 123, and 133.

The state equations of the transmission line currents, load currents, and load voltages are written on common reference frame (DQ) as:

$$\frac{di_{lineDi}}{dt} = -\frac{r_{linei}}{L_{linei}}i_{lineDi} + \omega i_{lineQi} + \frac{1}{L_{linei}}(v_{bDj} - v_{bDk}) \quad (9)$$

$$\frac{di_{lineQi}}{dt} = -\frac{r_{linei}}{L_{linei}}i_{lineQi} - \omega i_{lineDi} + \frac{1}{L_{linei}}(v_{bQj} - v_{bQk})$$

$$\frac{di_{loadDi}}{dt} = -\frac{R_{loadi}}{L_{loadi}}i_{loadDi} + \omega i_{loadQi} + \frac{1}{L_{loadi}}v_{bDi} \quad (10)$$

$$\frac{di_{loadQi}}{dt} = -\frac{R_{loadi}}{L_{loadi}}i_{loadQi} - \omega i_{loadDi} + \frac{1}{L_{loadi}}v_{bQi}$$

$$\frac{dv_{bDi}}{dt} = \omega v_{bQi} + \frac{1}{C_f}(i_{oDi} - i_{loadDi} \pm i_{lineDi,j}) \quad (11)$$

$$\frac{dv_{bQi}}{dt} = -\omega v_{bDi} + \frac{1}{C_f}(i_{oQi} - i_{loadQi} \pm i_{lineQi,j})$$

where $i_{lineDQ}$ and $i_{loadDQ}$ are the DQ components of the line and load currents respectively, $L_{line}$ and $r_{line}$ are the inductance and resistance of the line respectively, $L_{load}$ and $r_{load}$ are the inductance and resistance of the load respectively, $V_{bDQ}$ are the DQ components of the load voltage ($v_b$), and $i_{oDQ}$ are the DQ components of the output current $i_o$ all referred to the common reference frame (DQ).

Figure 5:
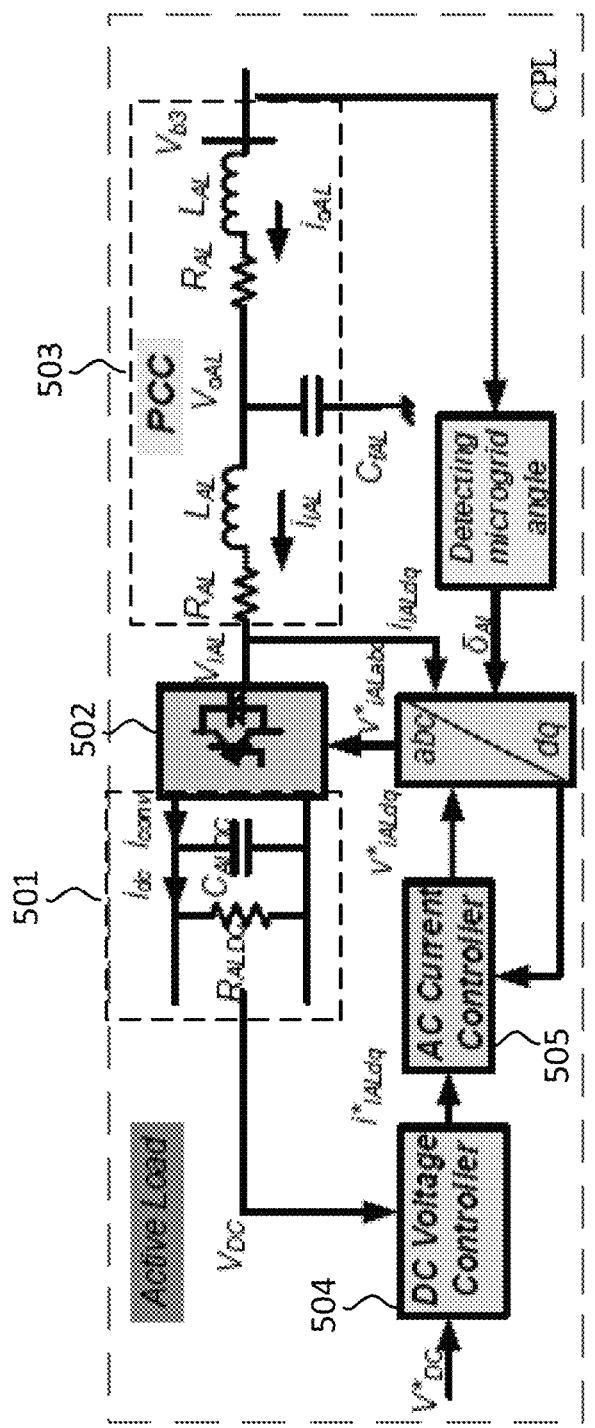
FIG. 5 shows a simplified circuit schematic of an exemplary active load, according to certain embodiments.

FIG. 5 shows a simplified circuit schematic of an exemplary active load, according to certain embodiments. The active load includes a DC load 501, a switching bridge 502, a LCL filter 503, a DC voltage controller 504, and an AC current controller 505. Similar to an inverter-based DG module in the autonomous microgrid 100, the active load has its own dq reference frame. A synchronization unit is added to synchronize an active load with a microgrid. It is used to extract the phase angle of the microgrid voltage. It provides the converter by the frequency and the amplitude of the fundamental component of the microgrid voltage.

This disclosure presents a synchronization method to dedicate the microgrid reference voltage, to track the microgrid frequency, and to overcome the traditional PLL problems, such as design complexity, bad accuracy, nonlinearity, tuning difficulties, slow response, design time consuming, and even negative impact on the control performance.

Figure 6:
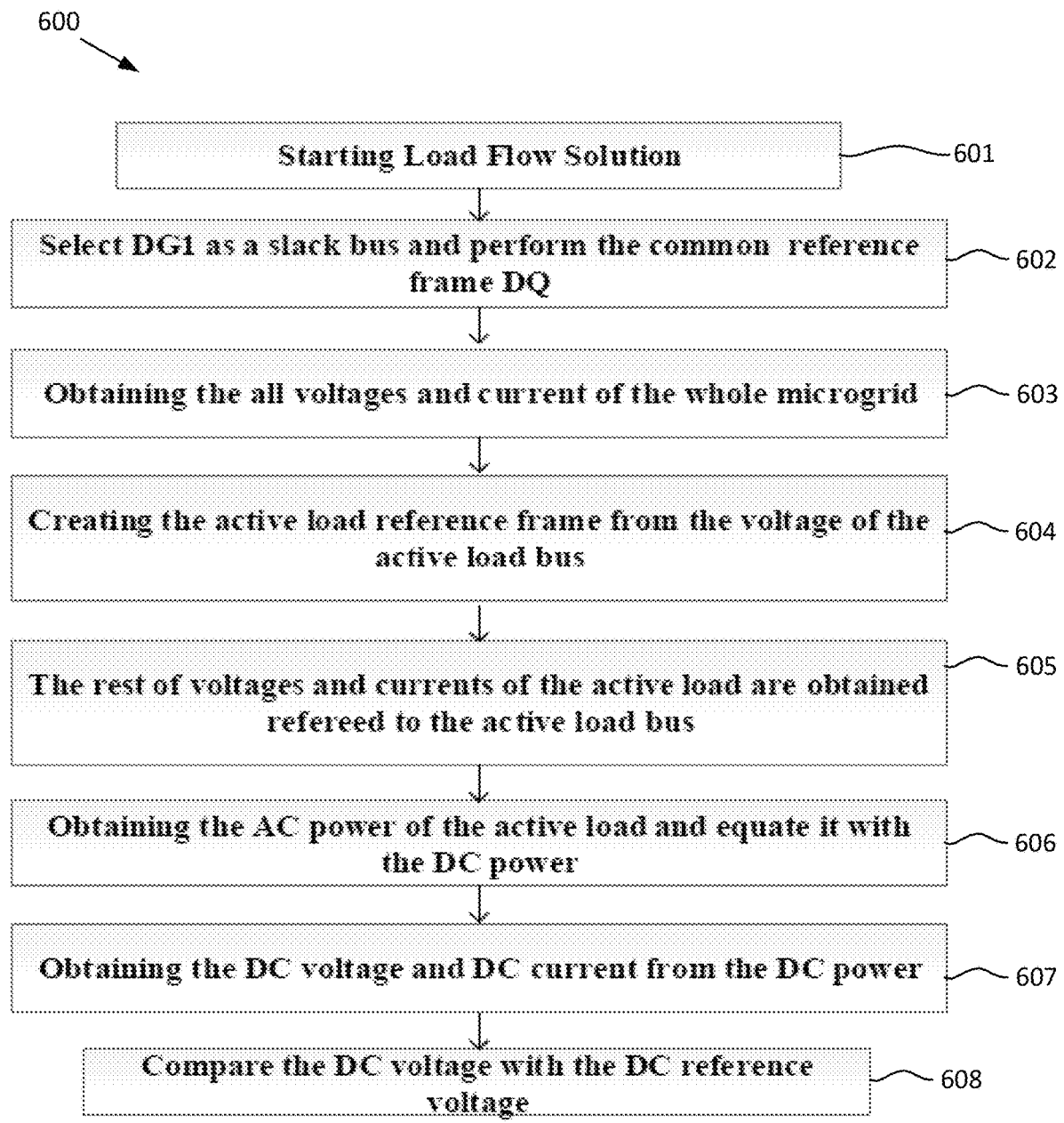
FIG. 6 shows a flow chart of the proposed synchronization method, according to certain embodiments.

FIG. 6 shows a flow chart of the proposed synchronization method, according to certain embodiments. The procedure 600 of the proposed method begins with step 601 to initiate load flow solution for an autonomous microgrid and then proceed to step 602.

At step 602, the procedure 600 selects the DG1 bus as a reference/slack bus. That is to say, the local reference frame of the DG1 module is used as a common reference frame for the microgrid. Then the procedure 600 proceeds to step 603.

At step 603, the procedure 600 obtains all voltages and currents of the whole microgrid referred to the DG1 bus. These voltages and currents share the same DQ reference frame. Then the procedure 600 proceeds to step 604.

At step 604, the procedure 600 creates a reference frame for an active load based on the voltage of the active load bus. In an embodiment, the d-component of the voltage at CPL bus is set to be the voltage magnitude at PCC while the q-component of the voltage is set to be zero. Additionally, the phase shift between the active load reference frame and the common reference frame, such as the reference angle $\delta_{ALj}$ of the active load in the FIG. 2 example, can be obtained using the dq components of the CPL voltage. This phase shift or angle will be used to synchronize active load with the microgrid. Then the procedure 600 proceeds to step 605.

At step 605, the procedure 600 obtains the rest of the voltages and currents of the active load referred to the active load bus. In the FIG. 5 example, using the active load bus voltage $V_{b3}$ and the active load output current $i_{oAL}$, the voltage $V_{oAL}$ at PCC in the active load network can be obtained. Then the input current $i_{IAL}$ to the switching bridge 502 and the voltage $v_{iAL}$ at the switching bridge 502 can be obtained. Then the procedure 600 proceeds to step 606.

At step 606, the procedure 600 obtains the AC power of the active load and equates it with the DC power. In the FIG. 5 example, the AC power $P_{ac}$ can be calculated as $P_{ac}=v_{idAL}*i_{ldAL}+v_{iqAL}*i_{lqAL}$. Assuming no losses, the DC power $P_{dc}$ and AC power $P_{ac}$ of the active load are equal, i.e., $P_{dc}=P_{ac}$. Then the procedure 600 proceeds to step 607.

At step 607, the procedure 600 obtains the DC voltage and DC current from the DC power. In the active load of the FIG. 5 example, the DC voltage $v_{dc}=(P_{dc\_al}*R_{dcal})$ where $P_{dc\_al}=P_{dc}$, the DC side current $i_{conv}=P_{dc\_al}v_d$, and the DC current $i_{dc}=v_{dc}/R_{dcal}$. The capacitor current can be obtained using the following equation $i_{cap}=i_{conv}-i_{dc}$. Finally, using the capacitor current, the capacitor voltage can be obtained. Then the procedure 600 proceeds to step 608.

At step 608, the procedure 600 compares the DC voltage with the DC reference voltage. In the FIG. 5 example, the DC voltage is $v_{dc}$ and the DC reference voltage is $v^*_{dc}$. Then the procedure 600 terminates the synchronization method.

It is noted that if there is more than one active load, the synchronization steps have to be repeated for each active load.

The state-space equations of the switching bridge of the active load can be written as follows:

$$v_{idAL}i_{ldAL}+v_{iqAL}i_{iqAL}=i_{conv}v_{DC} \quad (12)$$

where $v_{idqAL}$ are the dq components of the active load output voltage ($v_{iAL}$) and $i_{ldqAL}$ are the dq components of input current to the bridge ($i_{IAL}$).

The state-space equations of the DC capacitor circuit are written as:

$$\frac{dv_{DC}}{dt} = \frac{1}{C_{dc}}i_{conv} - \frac{1}{R_{dc}C_{dc}}v_{DC} \quad (13)$$

where $C_{dc}$ and $R_{dc}$ are the capacitance and resistance of the DC load 501 of the active load respectively.

Figure 7A:
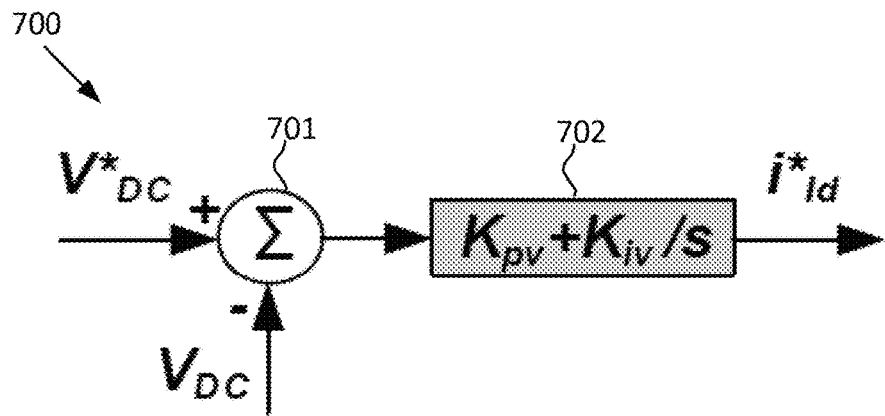
FIG. 7A shows an exemplary operation of a DC voltage controller used in an active load, according to certain embodiments.
Figure 7B:
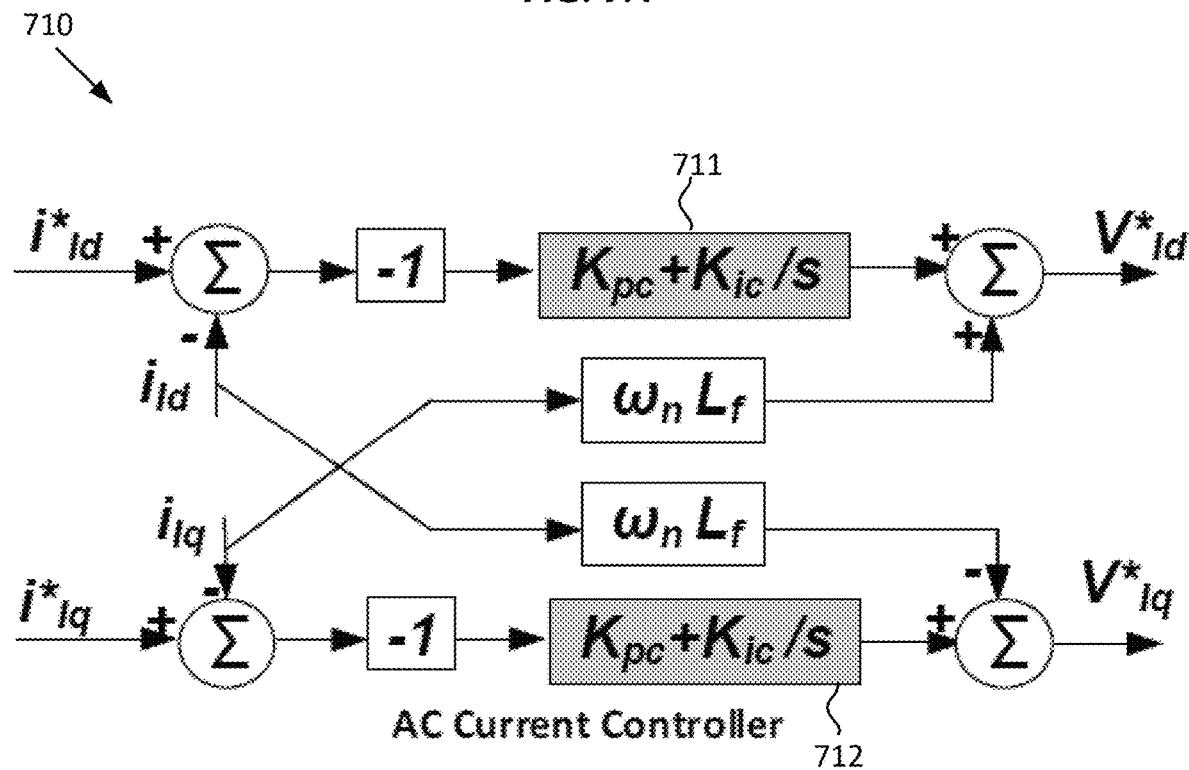
FIG. 7B shows an exemplary operation of an AC current controller used in an active load, according to certain embodiments.

FIGS. 7A and 7B show exemplary operations of a DC voltage controller 700 and an AC current controller 710 used in an active load respectively, according to certain embodiments. In the FIG. 5 example, the DC voltage controller 504 may operate according to FIG. 7A and the AC current controller 505 may operate according to FIG. 7B. PI controllers are used to control the DC voltage and the AC current of the active load as shown in FIGS. 7A and 7B. To obtain a good steady-state condition after any disturbance and/or load change, the parameters of the DC voltage and AC current controllers may be optimally tuned.

For the DC controller 700 shown in FIG. 7A, the DC voltage $v_{dc}$ is measured and subtracted from the DC reference voltage $v^*_{DC}$ through a subtraction block 701. Then a PI voltage controller 702 is used to produce the AC reference current meanwhile minimizes the error between the measured DC voltage $v_{dc}$ and the DC reference voltage $v^*_{DC}$ according to the following equation, $$i^*_{ldAL} = K_{pv\_AL}(v^*_{DC} - v_{DC}) + K_{iv\_AL}\int(v^*_{DC} - v_{DC})dt \quad (14)$$

where $k_{pv\_AL}$ and $k_{iv\_AL}$ are the controller parameters of the PI controller 702.

For the AC current controller 710 shown in FIG. 7B, two PI controllers 711 and 712 are used to control the current of the coupling inductor that couples the microgrid with the switching bridge of the active load by minimizing the error between the measured ac current and the reference current. The state equations of the current controller of both active load and DG inverter are similar. However, active load current has an opposite sign to the inverter current since the active load current is coining from the microgrid to active load while the inverter current is moving from the DG inverter to the grid. The feed-forward terms will be used to make sure that the measured D and Q components of the inductor current will be decoupled as displayed in FIG. 7B. Similar to the DC voltage controller, the current controller equation can be represented as follows:

$$v^*_{idAL} = \omega_n L_{fAL} i_{iqAL} - K_{pc\_AL}(i^*_{ldAL} - i_{ldAL}) - K_{ic\_AL}\int(i^*_{ldAL} - i_{ldAL})dt$$

$$v^*_{iqAL} = -\omega_n L_{fAL} i_{idAL} - K_{pc\_AL}(i^*_{lqAL} - i_{lqAL}) - K_{ic\_AL}\int(i^*_{lqAL} - i_{lqAL})dt \quad (15)$$

where $K_{pc\_AL}$ and $K_{ic\_AL}$ are the controller parameters of the PI controllers 711 and 712, $v_{idq^*AL}$ are the dq components of the reference voltage of the active load, $i_{ldq^*AL}$ are the dq components of reference current of the active load, and $L_{fAL}$ is the filter inductance of the active load.

In this disclosure, this optimization problem is solved with the help of PSO. In 1995, PSO developed by Eberhart and Kennedy is a population based stochastic optimization technique inspired by social behavior of bird flocking or fish schooling, as described by J. Kennedy et al. (1995). It is worth mentioning that PSO is used as an efficient tool for optimization that gives a balance between local and global search techniques. The PSO steps and advantages are summarized in M. Abido (2002). Using this technique, the population best solution (candidate) is to be obtained by starting random particles selection and updating the generations inside this population. Searching for the lowest objective function, the particles are trying to follow the optimum particles to get the highest fitness. At iteration n+1, the new particle position of each is given:

$$k_{n+1}^i = k_n^i + v_{n+1}^i \quad (16)$$

where $k_{n+1}^i$ is the position of particle i at iteration n+1 and $v_{n+1}^i$ is the corresponding velocity vector.

The velocity of each particle is adapted at each time step. The updated velocity $v_{n+1}^i$ depends mainly on the current velocity $v_n^i$, the distance between the particle and its personal best position, and the distance between the particle and the global best position. The expression of the update velocity $v_{n+1}^i$ is given by:

$$v_{n+1}^i = wv_n^i + c_1 r_1(p_{best} - k_n^i) + c_2 r_2(g_{best} - k_n^i) \quad (17)$$

where $r_1$ and $r_2$ are random numbers between 0 and 1, $c_1$ and $c_2$ are the "trust" parameters, $g_{best}$ is the best position in the swarm at time n, $p_{best}$ is the best position for particle i, and w is the inertia weight.

The controller parameters $K := [K_{pv}, K_{iv}, K_{pc}, K_{ic}, K_{pv\_AL}, K_{iv\_AL}, K_{pc\_AL}, K_{ic\_AL}]^T$ bounded as $K^{min} \leq K \leq K^{max}$ may be tuned with the power sharing parameters $m_p$ and $n_q$ to improve transient performances of a microgrid. Based on time domain simulation, the optimal values of the controller gains and power sharing parameters are set. The design problem is formulated where an objective function J is proposed as:

$$J = \int_{t=0}^{t=t_{sim}} [(P_m - P_{ref})^2 + (v^*_{DC} - v_{DC})^2] \cdot t \, dt \quad (18)$$

where t is added to ensure a minimum settling time, $P_m$ and $P_{ref}$ are measured active power and reference active power of the DG inverter, respectively, and $V^*_{dc}$ and $V_{dc}$ are the reference DC voltage and the measured DC voltage of the active load.

In this disclosure, the autonomous microgrid 100 shown in FIG. 1 is used for simulation. The rated line-to-line voltage of the autonomous microgrid is 380 V. The power rating of each converter is 10 kVA. With the system parameters given in Table I, the proposed synchronization method is examined with simulations carried out in MATLAB. A weighted objective function based on time-domain is considered to curtail the error in the DC voltage and the measured active power. The controller design problem has been solved using PSO. The optimal parameters are given in Table II. Through the time domain simulations with the proposed controller and optimal settings, the microgrid performance is examined under different disturbances.

Figure 8A:
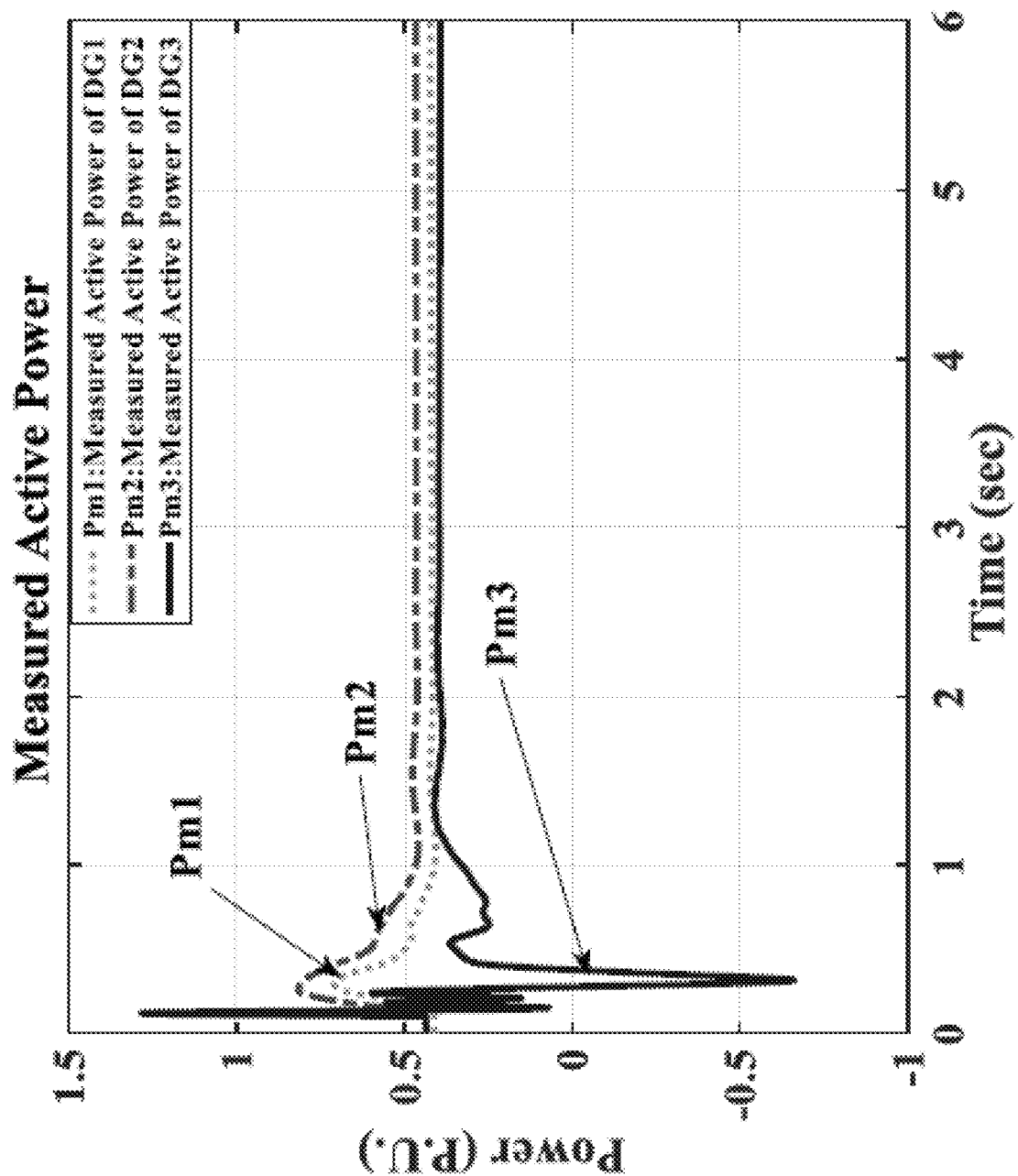
FIG. 8A shows the output real power responses of the three DGs in the autonomous microgrid 100 when the voltage at active load bus is stepped down to 0.5p.u.
Figure 8B:
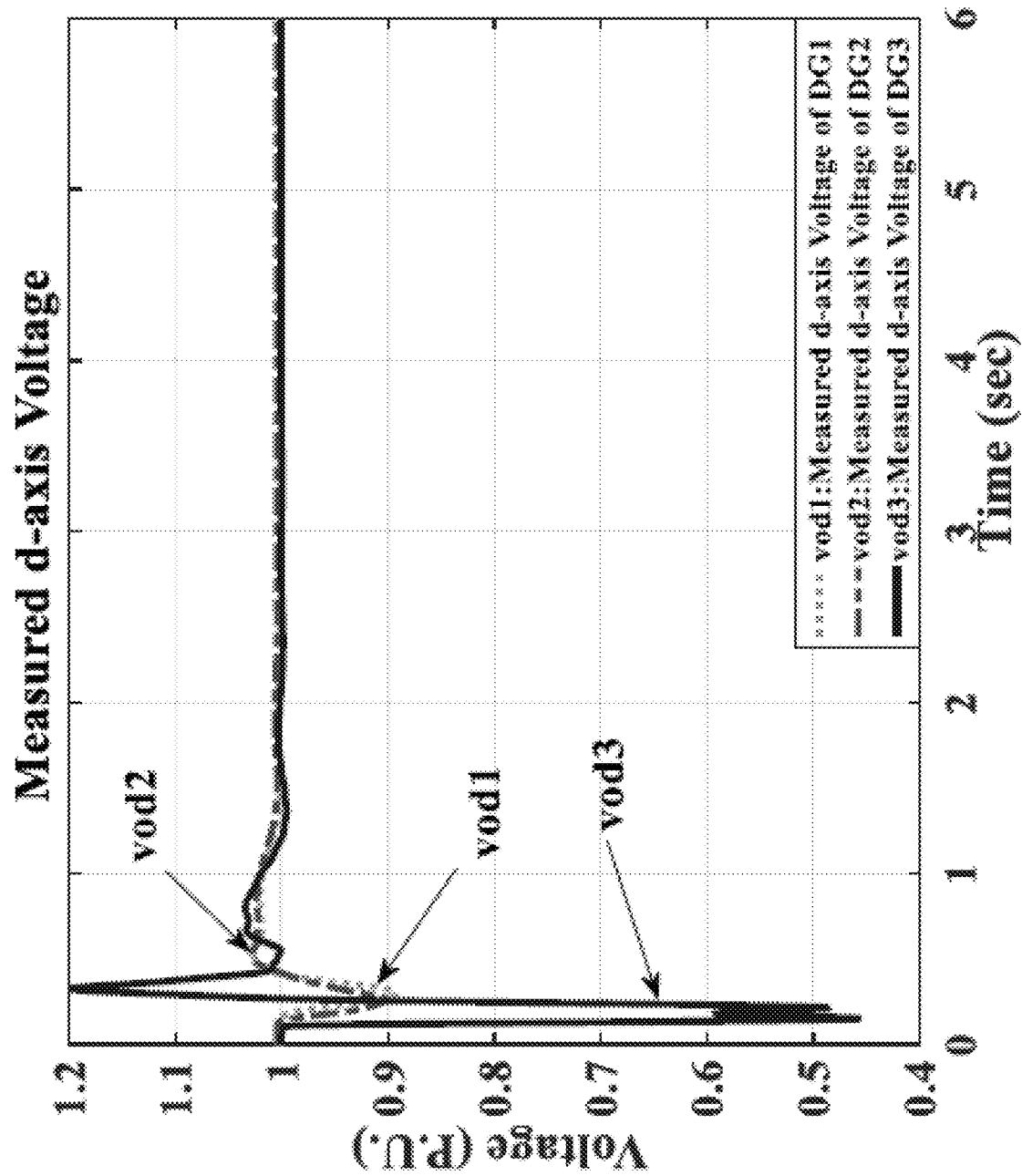
FIG. 8B shows the d-axis output voltage responses of the three DGs in the autonomous microgrid 100 when the voltage at active load bus is stepped down to 0.5p.u.
Figure 8C:
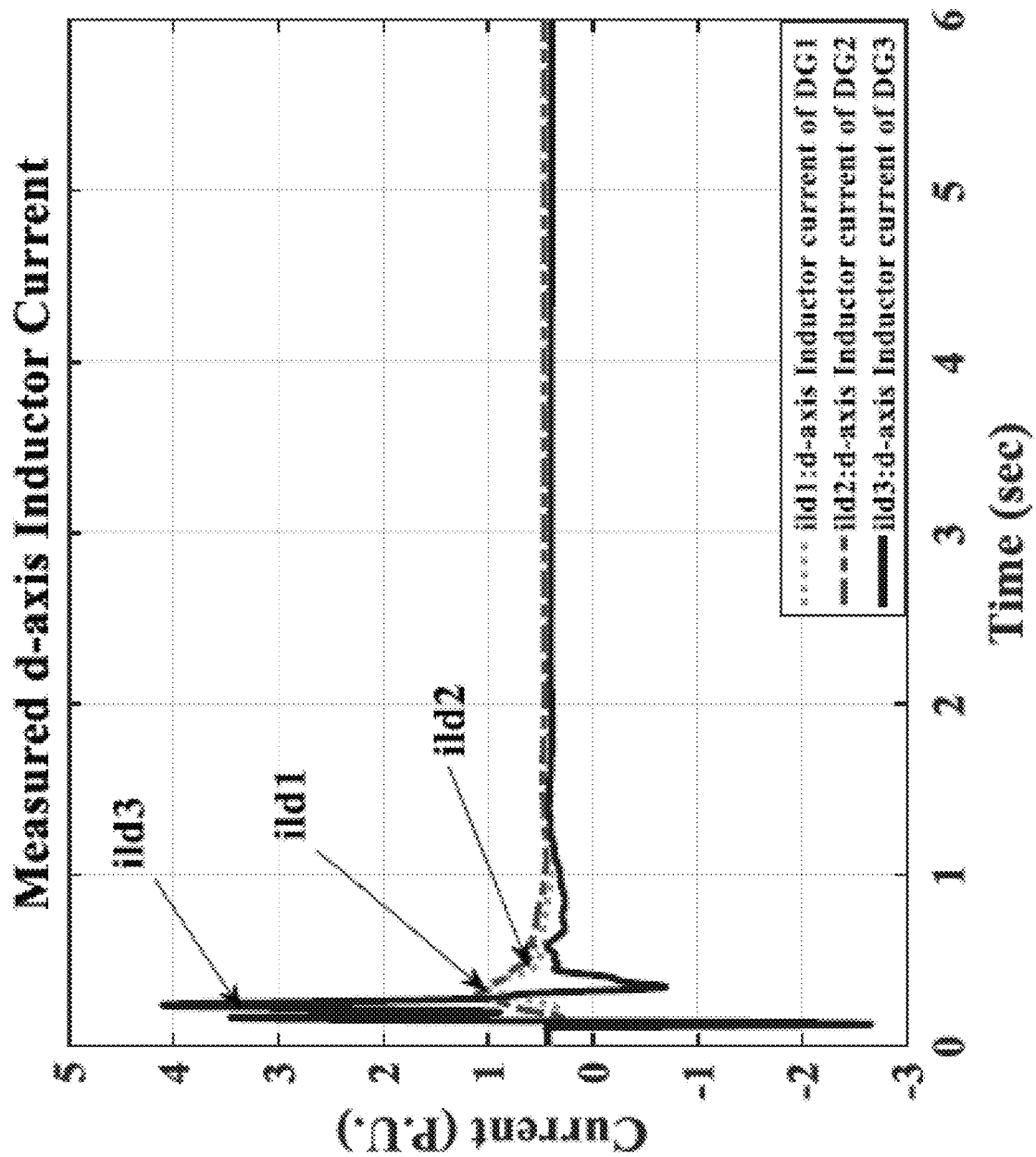
FIG. 8C shows the d-axis output current responses of the three DGs in the autonomous microgrid 100 when the voltage at active load bus is stepped down to 0.5p.u.
Figure 8D:
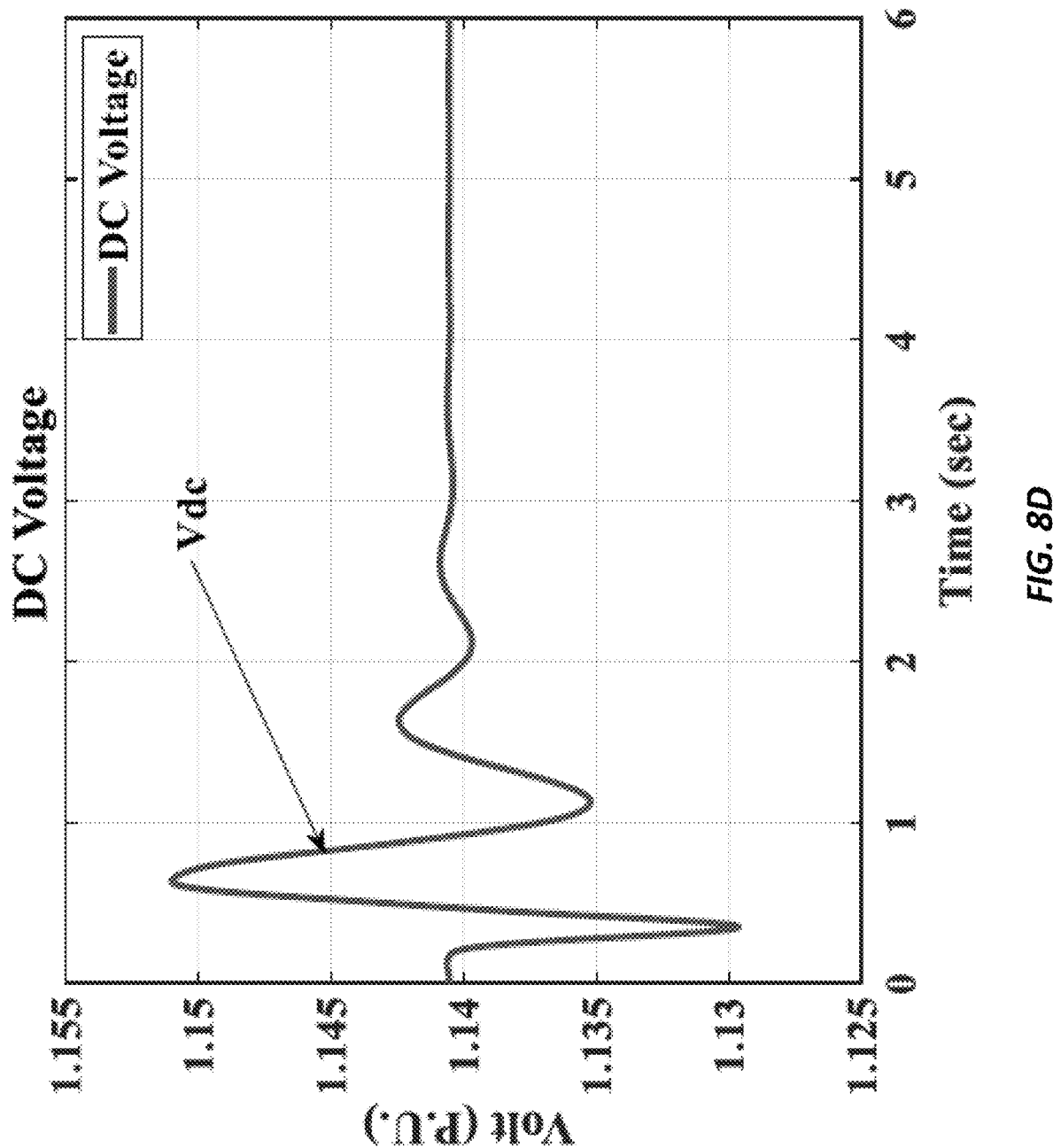
FIG. 8D shows the voltage response of the DC side of the active load in the autonomous microgrid 100 when the voltage at active load bus is stepped down to 0.5p.u.

Firstly, the microgrid response is checked after the voltage at active load bus is stepped down to 0.5 p.u. FIGS. 8A-8E show the satisfactory damping characteristics of the considered microgrid for this disturbance. The output real power responses of the three DGs are provided in FIG. 8A while FIGS. 8B-8C show the responses of the d-axis of the output voltages and currents of the three DGs. FIG. 8D shows the voltage response of the DC side of the active load. The DG3 output response has high oscillations since the active load is connected near to DG3. Even the disturbance is also done at the active load bus.

TABLE I

SYSTEM PARAMETERS

| Parameter | Value | Parameter | Value |
| --- | --- | --- | --- |
| Microgrid Parameters | | | |
| $f_s$ | 8 kHz | $V_n$ | 381 V |
| $L_f$ | 1.35 mH | $L_c$ | 0.35 mH |
| $C_f$ | 50e-6 F. | $C_b$ | 50e-6 F. |
| $r_f$ | 0.1Ω | $f_c$ | 0.03Ω |
| $\omega_R$ | 314.16 rad/sec | $\omega_c$ | 31.416 rad/sec |
| $r_j + jx_j$ | (0.23 + j0.1) Ω | $r_2 + jx_2$ | (0.35 + j0.58) Ω |
| Active Load Parameters | | | |
| $L_f$ | 2.3 mH | $L_c$ | 0.93 mH |
| $C_f$ | 8.8e-6 F | $r_c$ | 0.03Ω |
| $r_f$ | 0.1Ω | | |
| $R_{dc}$ | 67.123Ω | $C_{dc}$ | 100e-6 F |

In addition, during disturbances in the AC side of the active load, large power oscillations may occur between both AC and DC sides of the active load that will lead to DC overvoltage and it may stress the active load switches, as described by T. Kalitjuka, "Control of Voltage Source Converters for Power System Applications", Master's thesis, Norwegian University of Science and Technology, Department of Electrical Power Engineering, 2011, p. 67. Actually, decreasing the DC capacitance will reduce the volume and the cost of the active load converter while increasing the DC capacitance will reduce the overvoltage in the DC side of the active load, as described by T. Kalitjuka (2011).

TABLE II

OPTIMAL PARAMETERS

| Parameter | Value | Parameter | Value |
|---|---|---|---|
| Controller Parameters of the three DG units | | | |
| $K_{pv(Amp/Watt)}$ | 1.19585 | $K_{pc(Amp/Watt)}$ | 44.1091 |
| | 1.43531 | | 31.8037 |
| | 1.63797 | | 40.8816 |
| $K_{iv(Amp/Joule)}$ | 4.4568 | $K_{ic(Amp/Joule)}$ | 35.8275 |
| | 6.17159 | | 26.904 |
| | −0.69434 | | 13.4463 |
| Power Sharing Parameters of the three DG units | | | |
| $m_p$ | 3.79404e−07 | $H_g$ | 9.36593e−05 |
| | 6.75934e−07 | | 1.86121e−05 |
| | 1.71857e−07 | | 3.21349e−05 |
| Active Load Parameters | | | |
| $K_{pv\_AL(Amp/Watt)}$ | 0.331792 | $K_{pc\_AL(AMP/Watt)}$ | 33.2732 |
| $K_{iv\_AL(Amp/Joule)}$ | 4.33114 | $K_{ie\_AL(AMP/Joule)}$ | −4.61844 |

Figure 8E:
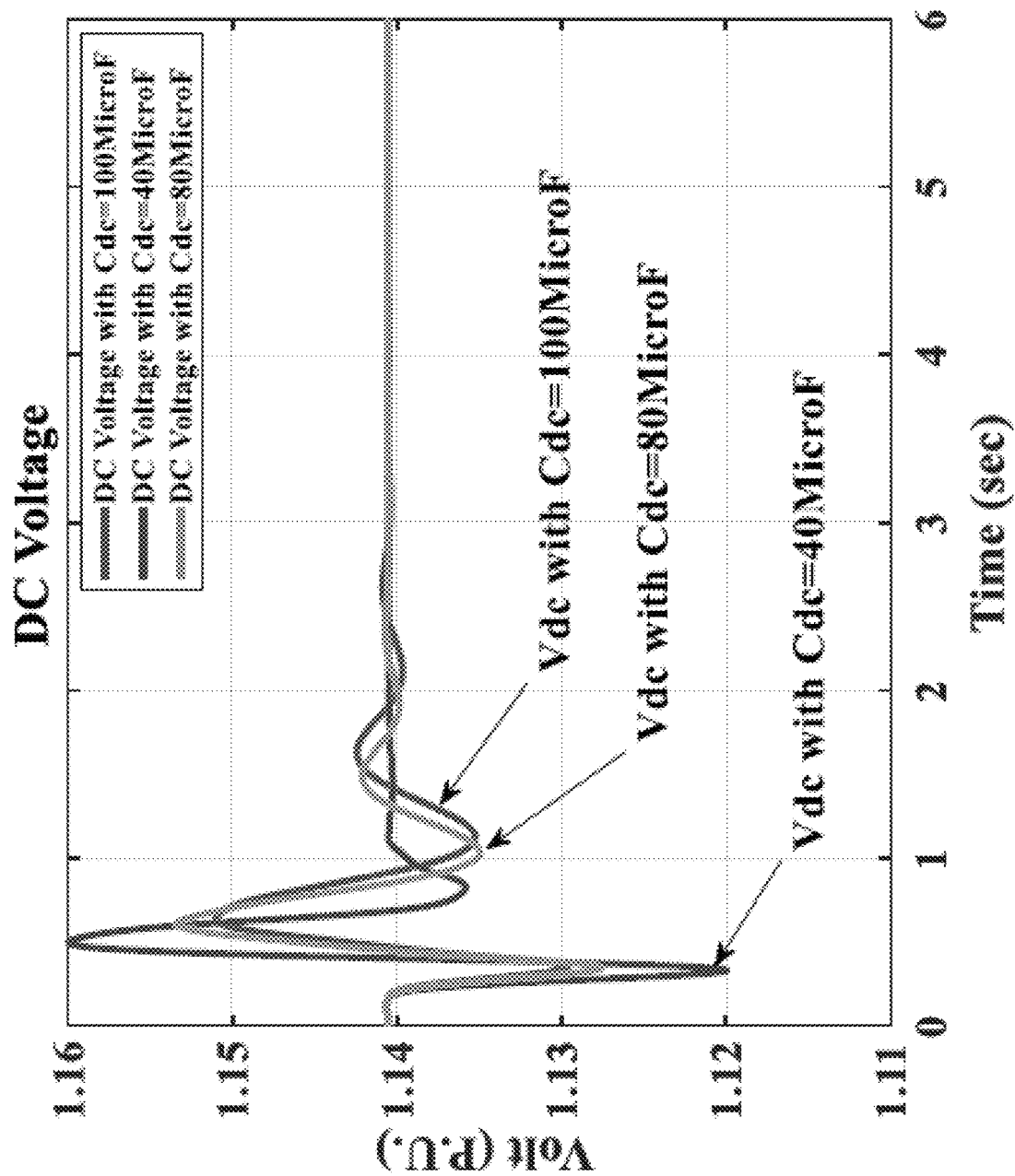
FIG. 8E shows that increasing the DC capacitance of the active load will reduce the DC overvoltage when the voltage at active load bus is stepped down to 0.5p.u.

Therefore, the DC capacitor has a great effect on the active load operation. FIG. 8E illustrates that increasing the DC capacitance of the active load will reduce the DC overvoltage. It can be observed from the results that the overshoots and the settling time of the system performance are significantly improved with increasing the DC capacitance.

Figure 9A:
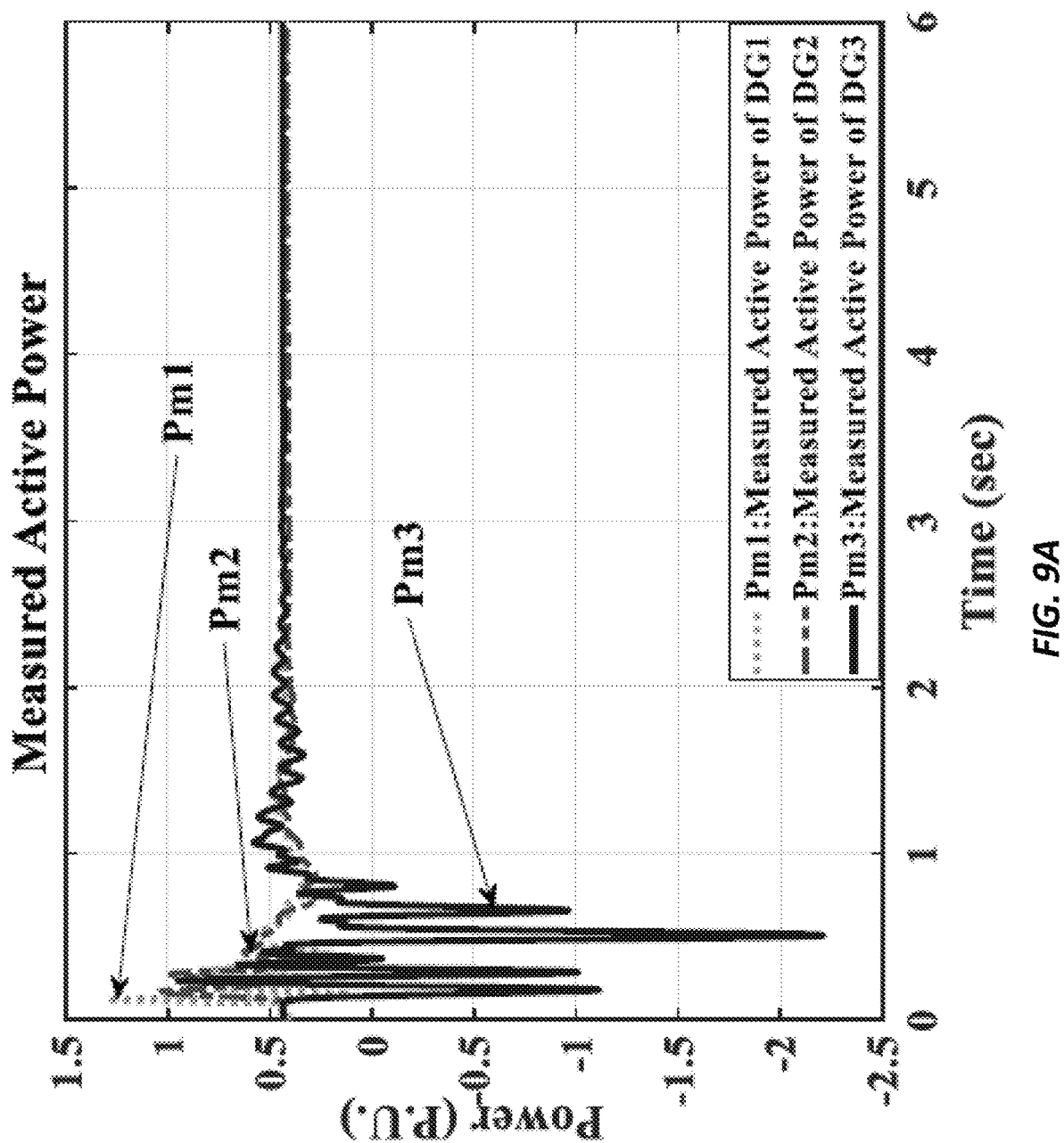
FIG. 9A shows the output real power responses of the three DGs in the autonomous microgrid 100 when the voltage at CIL bus is stepped down to 0.5p.u.
Figure 9B:
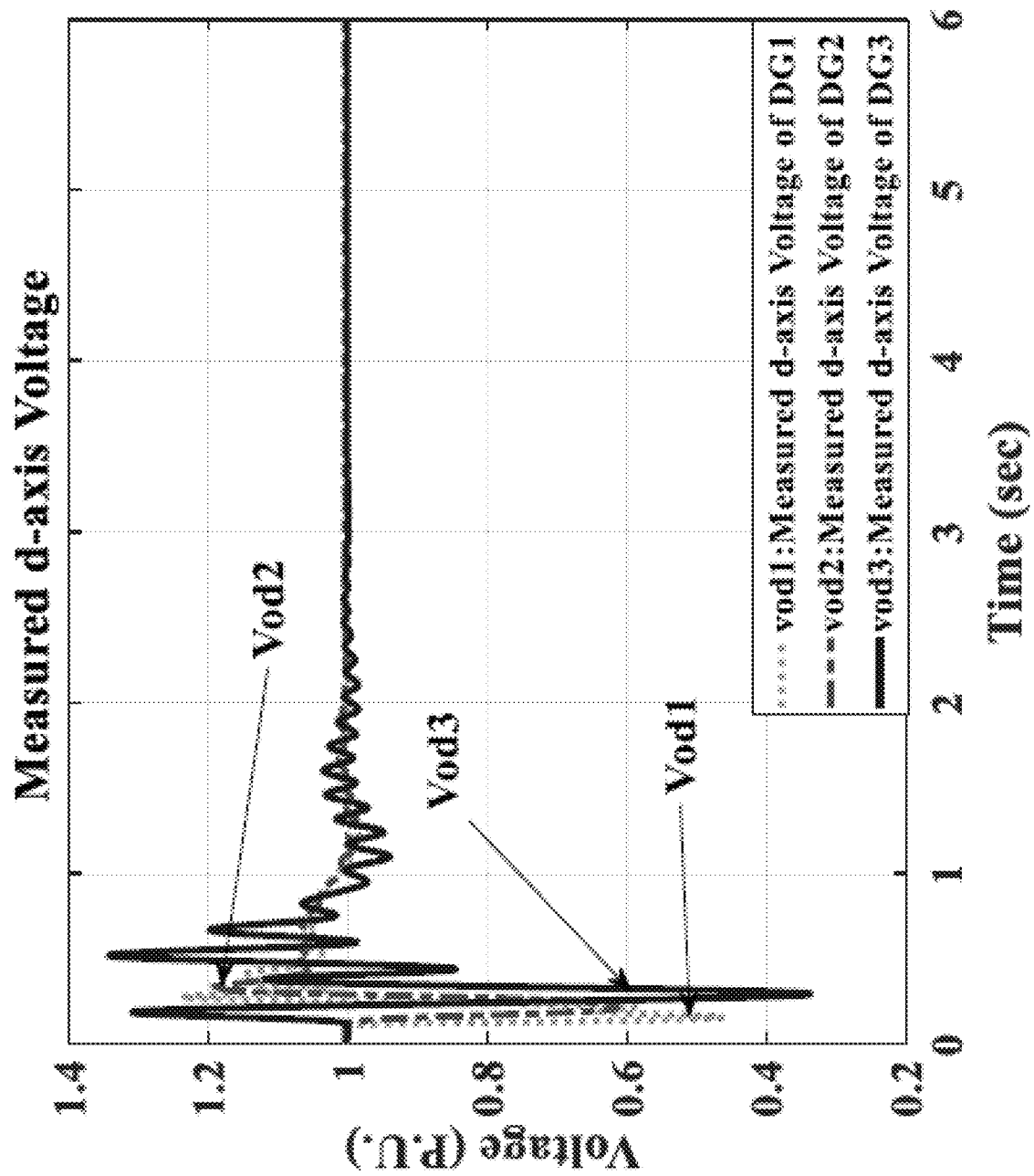
FIG. 9B shows the d-axis output voltage responses of the three DG inverters in the autonomous microgrid 100 when the voltage at CIL bus is stepped down to 0.5p.u.
Figure 9C:
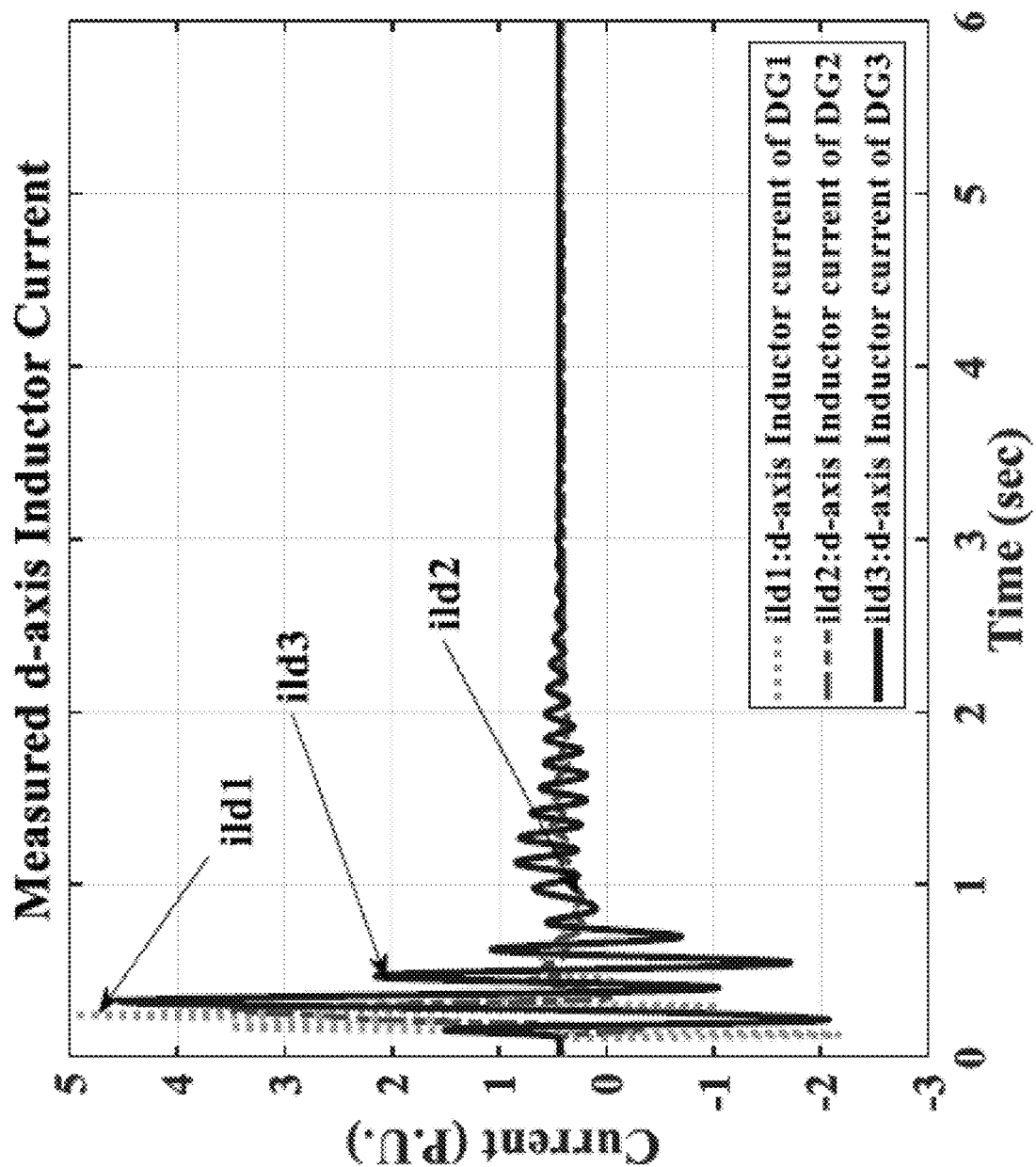
FIG. 9C shows the d-axis AC active load current responses of the three DG inverters in the autonomous microgrid 100 when the voltage at CIL bus is stepped down to 0.5p.u.
Figure 9D:
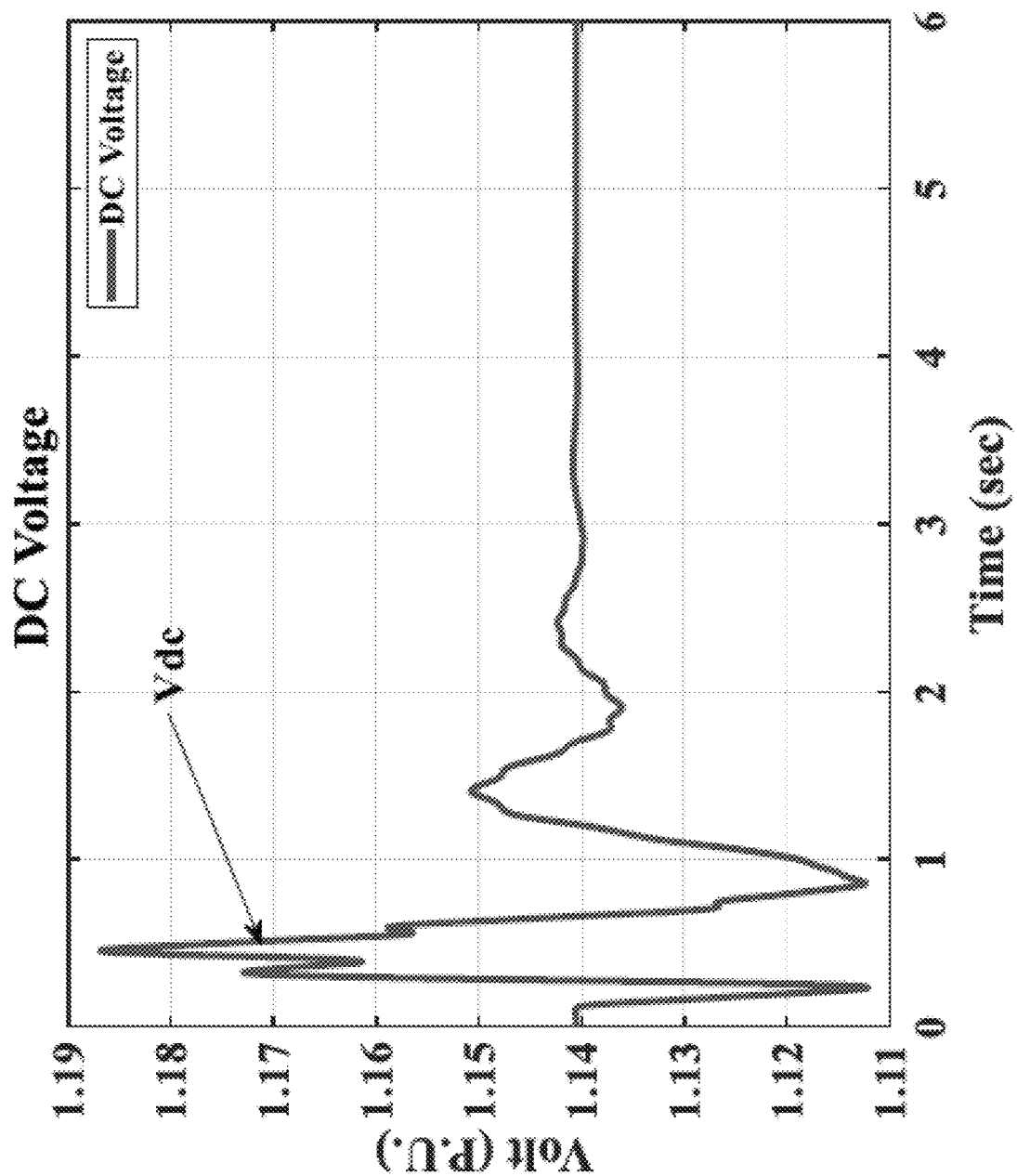
FIG. 9D shows the voltage response of the DC side of the active load in the autonomous microgrid 100 when the voltage at CIL bus is stepped down to 0.5p.u.

Secondly, another disturbance has been applied to test and examine the microgrid performance. The voltage at CIL bus is stepped down to 0.5p.u. FIGS. 9A-9D illustrate the microgrid responses due to this disturbance. The results display the satisfactory damping characteristics of the proposed microgrid. It can be observed from the given results that the overshoots and settling time of the system performance is significantly improved. In addition, the results show impressively how the proposed controller enhanced the damping characteristics. For this disturbance, the responses of the output real power of the three DGs are shown in FIG. 9A. FIGS. 9B-9C show the responses of the d-axis output voltages and AC active load currents of the three DG inverters respectively. FIG. 9D illustrates the voltage response of the DC side of the active load regarding this disturbance.

Figure 10A:
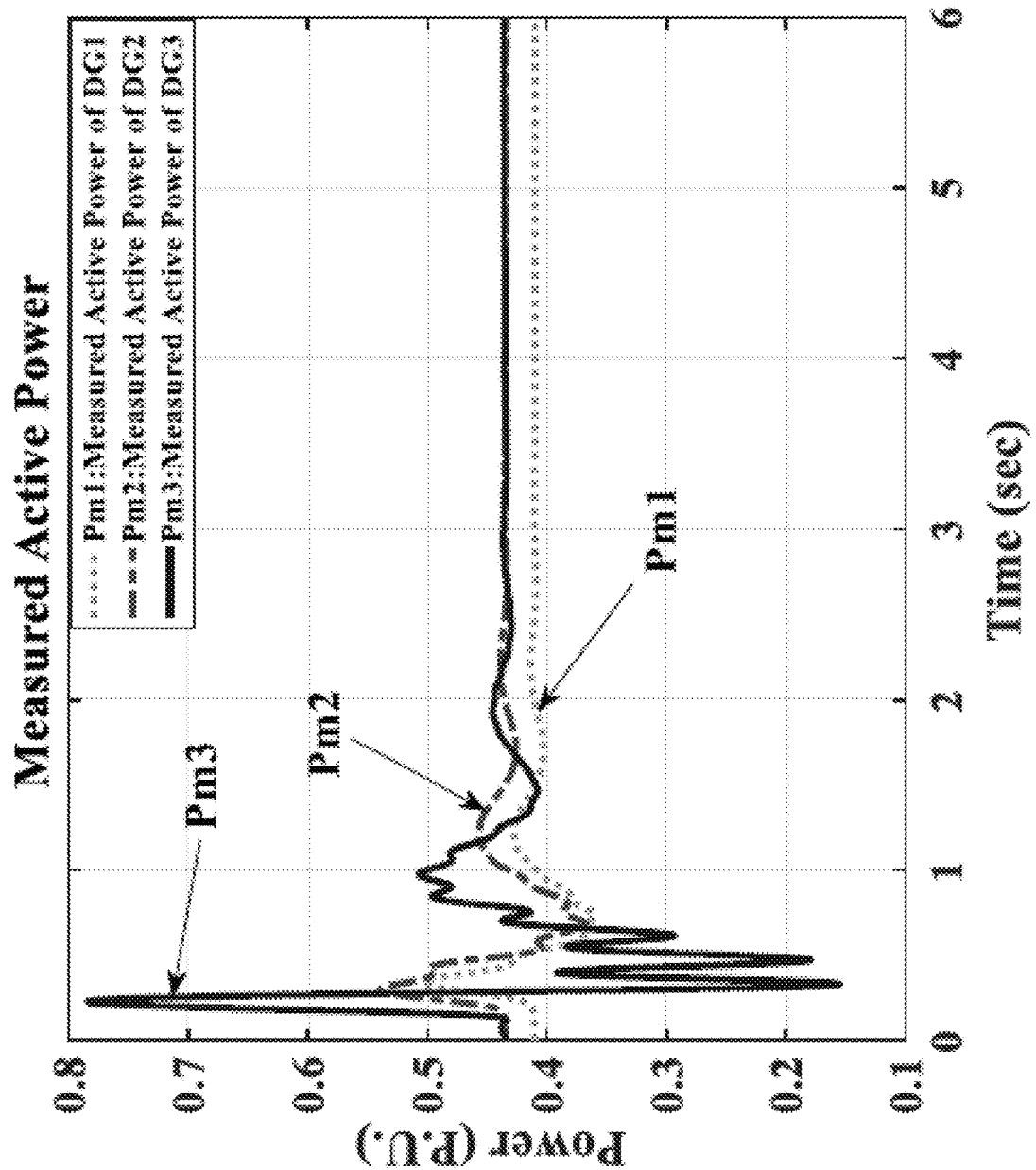
FIG. 10A shows the output active power responses of the three DGs in the autonomous microgrid 100 when a step up change of the reference DC voltage of the active load has been applied.
Figure 10B:
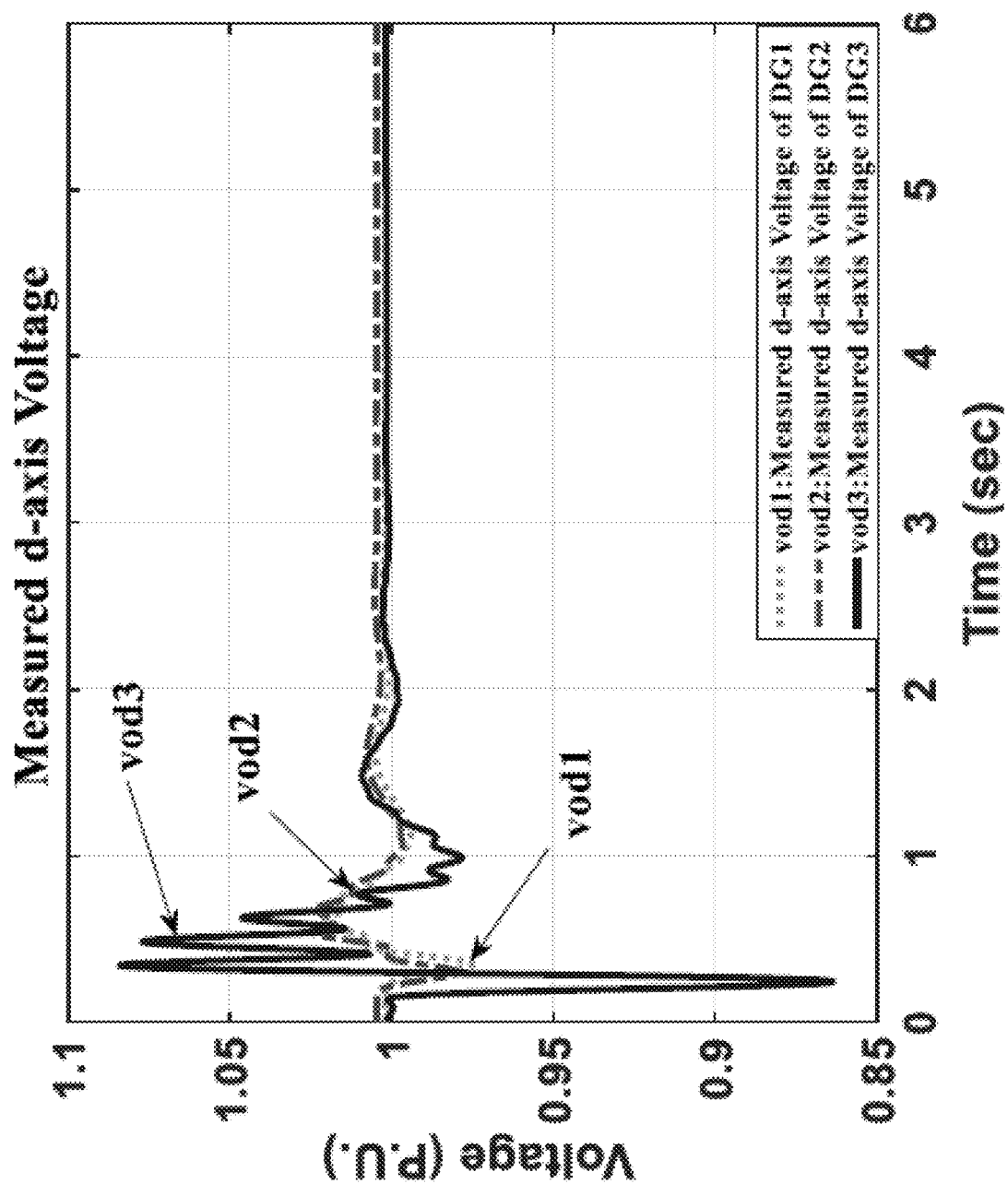
FIG. 10B shows the d-axis output voltage responses of the three DG inverters in the autonomous microgrid 100 when a step up change of the reference DC voltage of the active load has been applied.
Figure 10C:
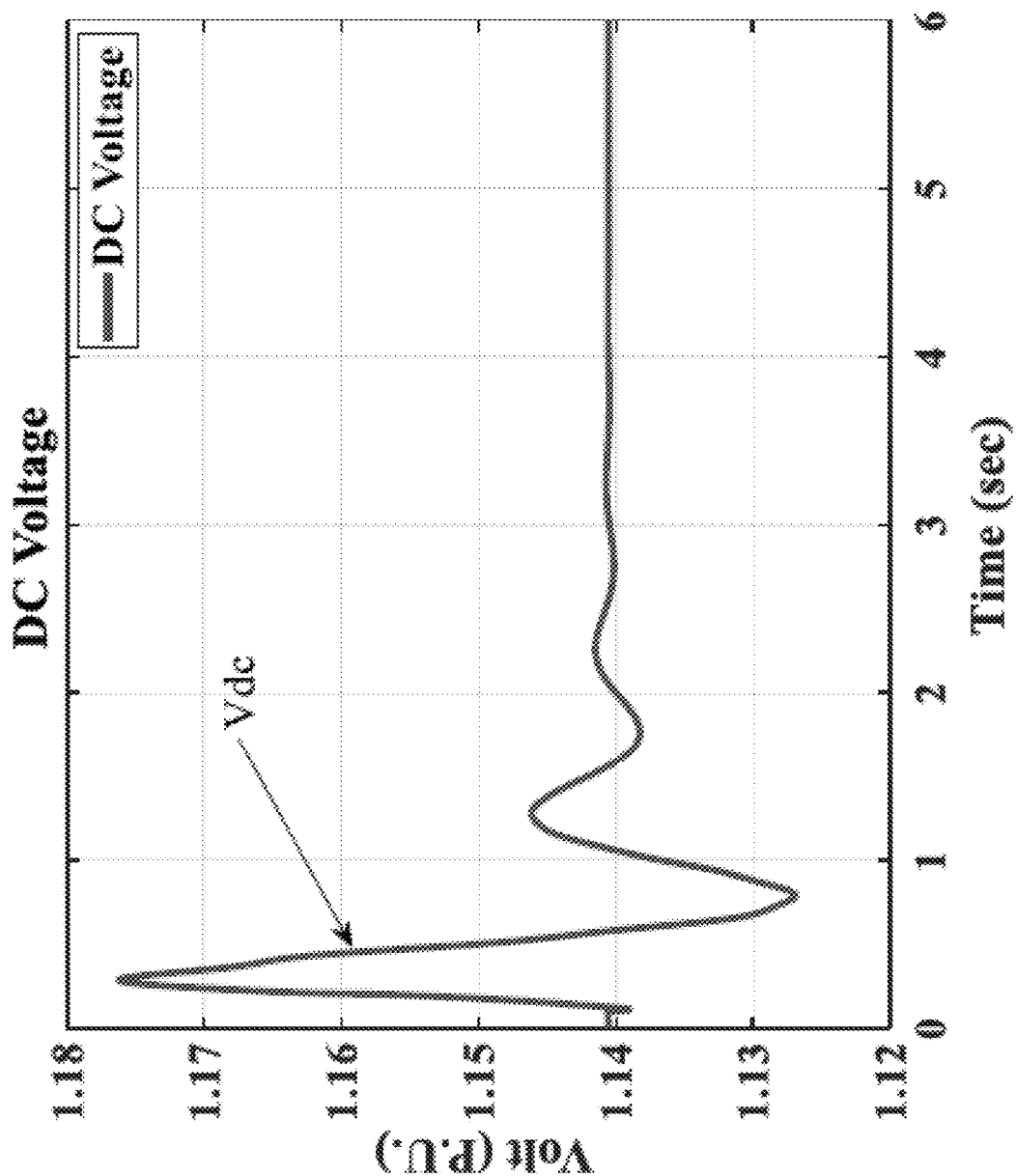
FIG. 10C shows the voltage response of the DC side of the active load in the autonomous microgrid 100 when a step up change of the reference DC voltage of the active load has been applied.

Thirdly, a step up change of the reference DC voltage of the active load has been applied to assure the controller capability with the optimal settings in terms of overshoot and delay time. With the optimal settings, the proposed controller has been investigated through the time domain simulation. The output active power responses of the three DGs are shown in FIG. 10A while FIG. 10B illustrates the responses of the d-component of the output voltages of the three inverters for the considered disturbance. FIG. 10C illustrates the voltage response of the DC side of the active load due to this disturbance. The results show the satisfactory damping characteristics of the microgrid considered. The responses show that the damping characteristics are greatly enhanced and the system performance in terms of overshoots and settling time is improved significantly.

Figure 11A:
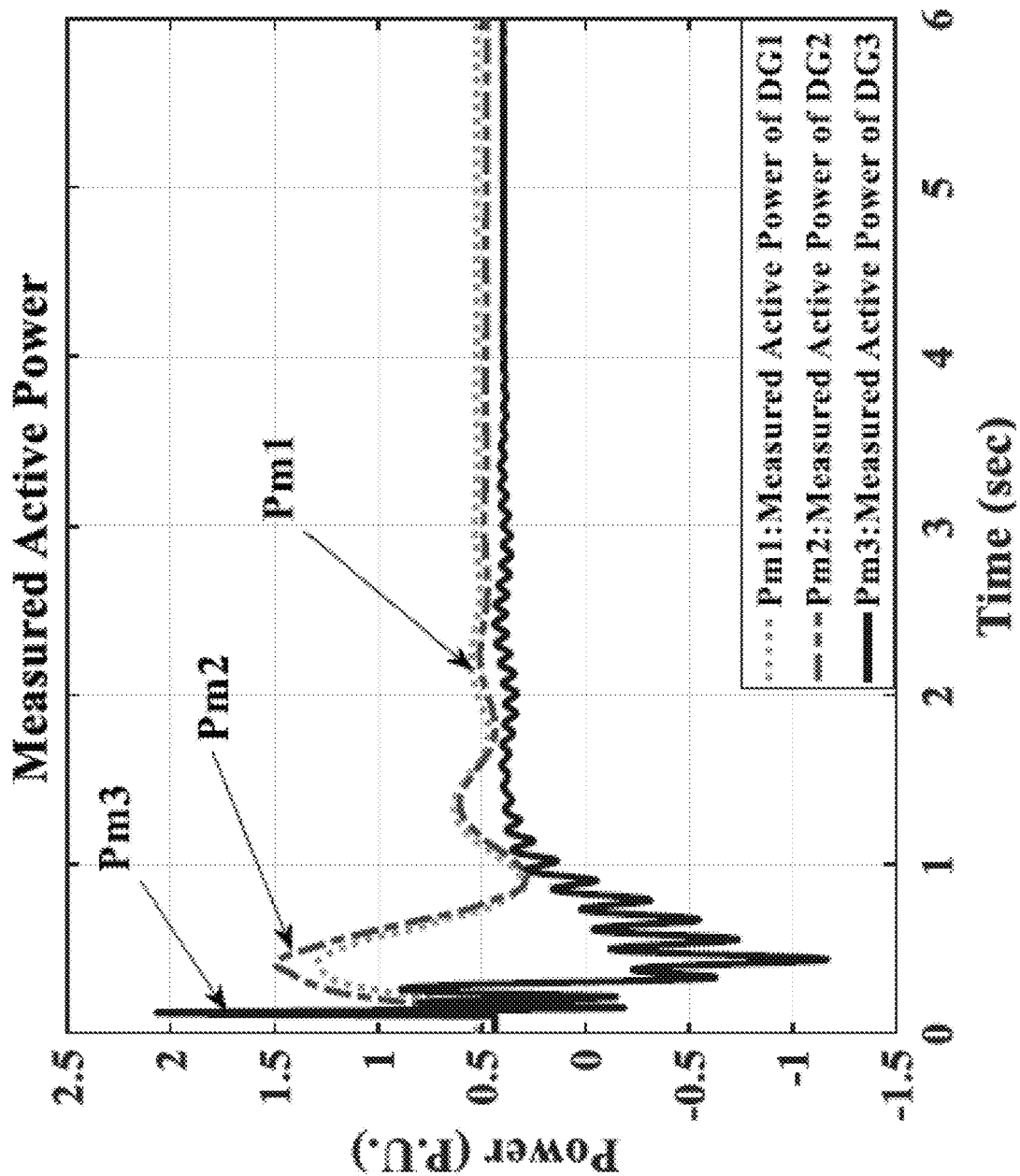
FIG. 11A shows the output real power responses of the three DGs in the autonomous microgrid 100 with replacing CIL by another active load when the bus voltage of the active load2 has been stepped down.
Figure 11B:
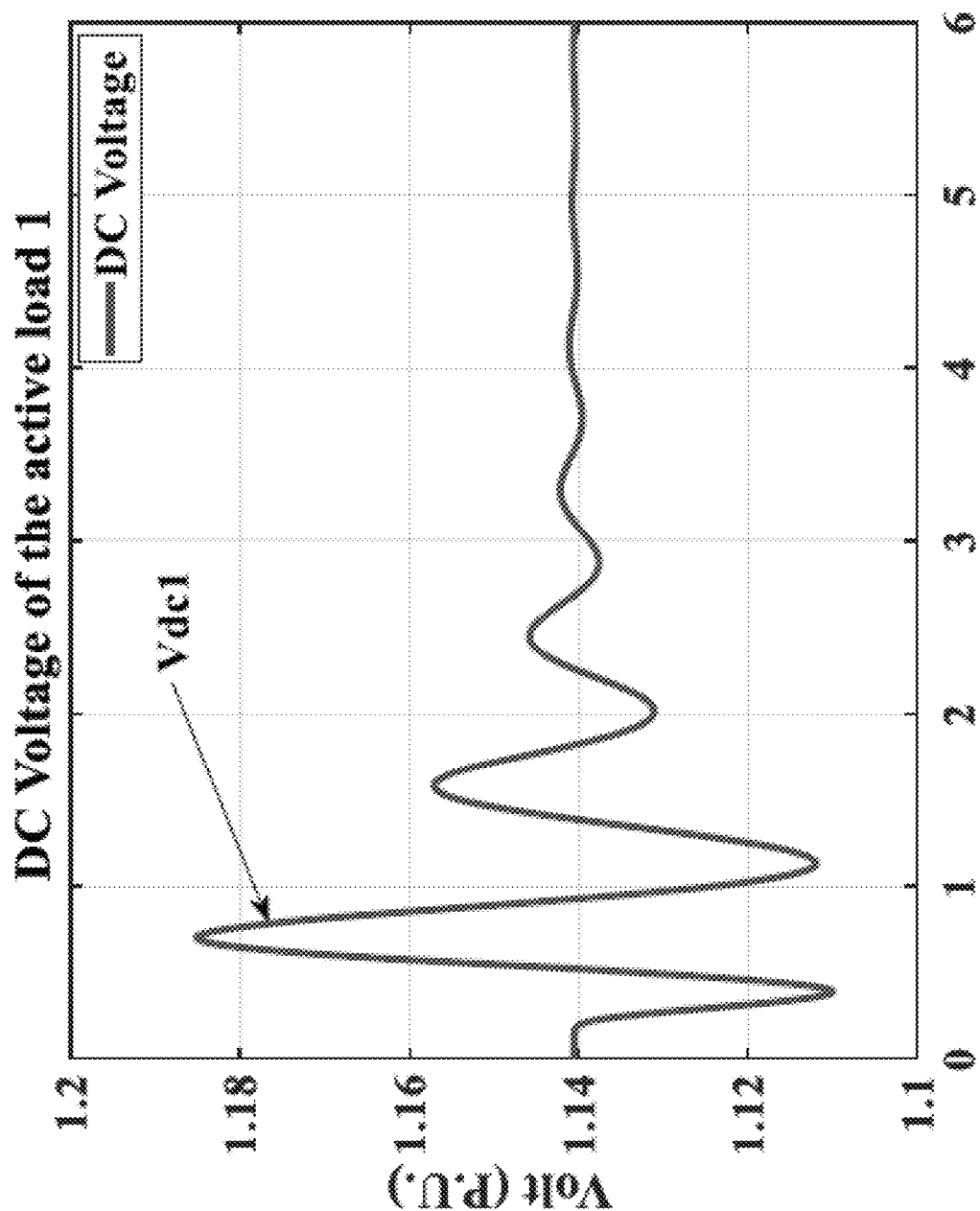
FIG. 11B shows the DC voltage responses of active load1 in the autonomous microgrid 100 with replacing CIL by another active load when the bus voltage of the active load2 has been stepped down.
Figure 11C:
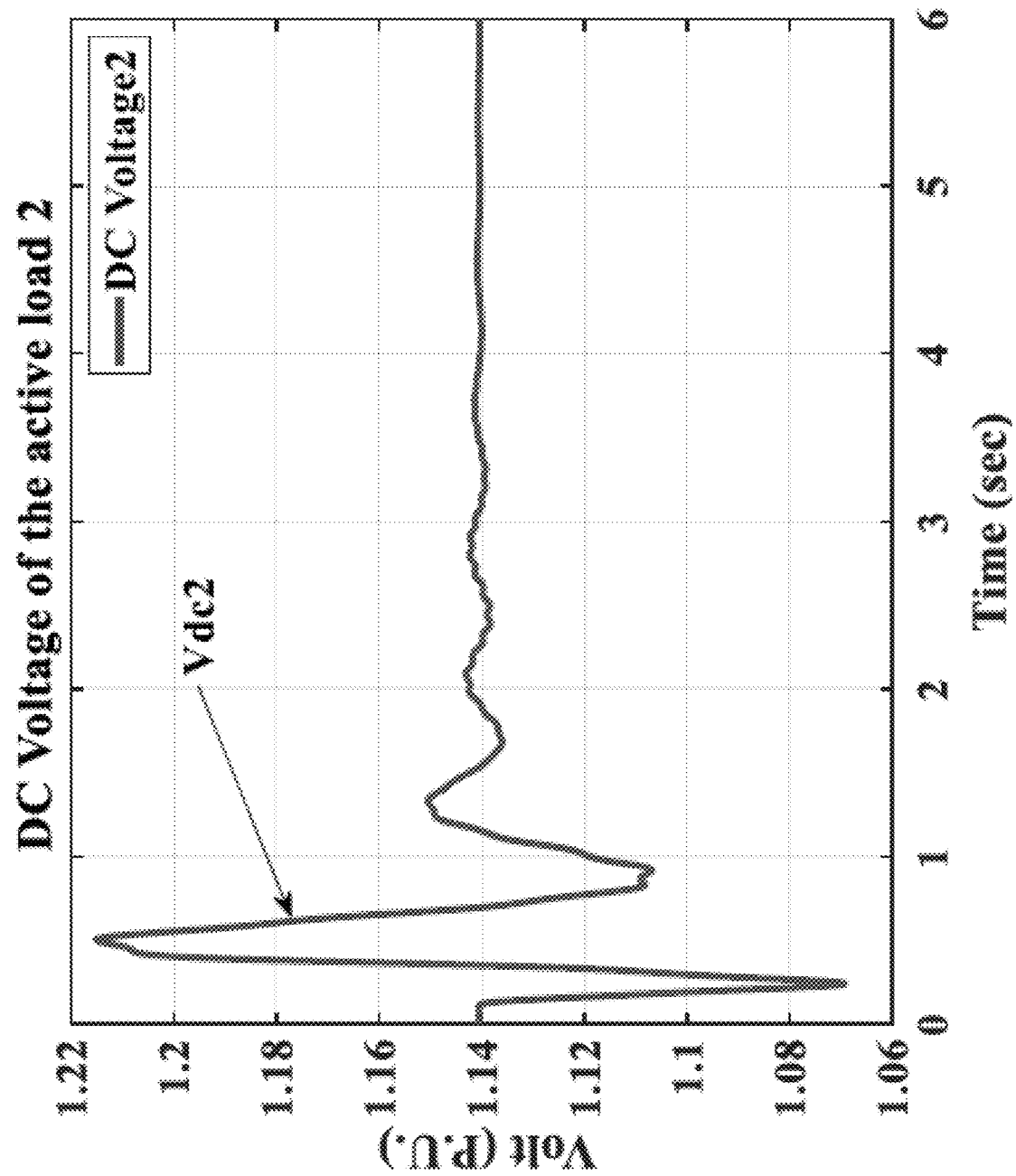
FIG. 11C shows the DC voltage responses of active load2 in the autonomous microgrid 100 with replacing CIL by another active load when the bus voltage of the active load2 has been stepped down.

Fourthly, to confirm that the proposed method can be generalized for N numbers of inverters and/or M numbers of active loads, another active load has been added to the considered microgrid. In the FIG. 1 example, the microgrid includes two different loads: the passive load (CIL 104) at bus 1 and the active load (CPL 105) at bus 4. To confirm the generalization of the proposed controller, CIL 104 at bus 1 is replaced by another active load CPL, referred herein to as active load1 at bus 1 ($V_{b1}$), while the active load CPL 105 is referred herein to as active load2 at bus 4 ($V_{b3}$). Therefore, the microgrid includes two active loads: one is active load1 at bus 1 and the other is active load2 at bus 4. The output real power responses of the three DGs are shown in FIG. 11A when the bus voltage ($V_{b3}$) of the active load2 has been stepped down. In addition, the DC voltage responses of both active loads are showed in FIGS. 11B-11C, respectively, when the bus voltage ($V_{b3}$) of the active load2 has been stepped down. The results show the satisfactory damping characteristics of the considered microgrid.

Figure 12:
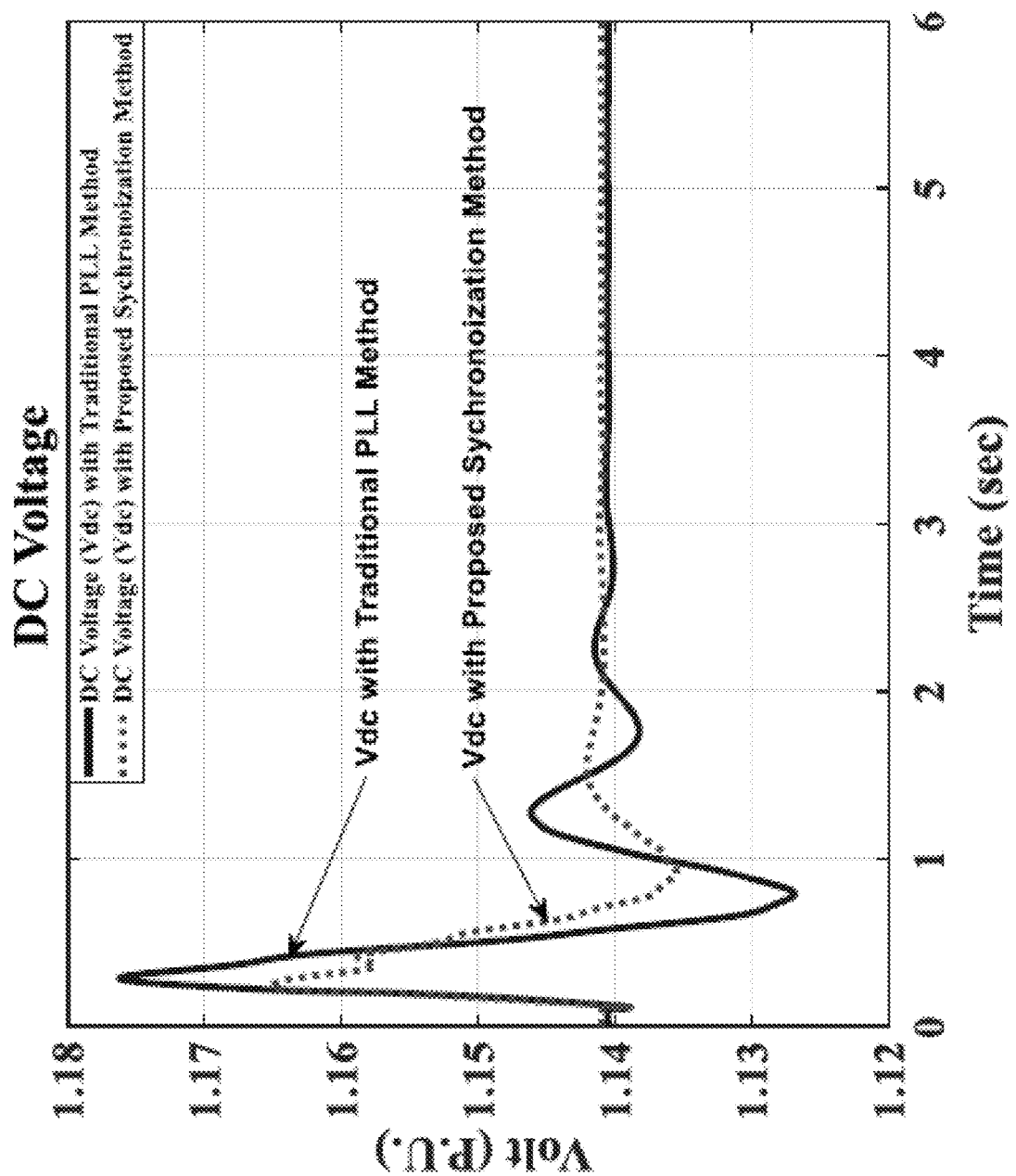
FIG. 12 shows a comparison of DC voltage response between the proposed synchronization method and the traditional PLL method when a step change disturbance occurs at the DC voltage reference.

Finally, to prove the superiority of the proposed synchronization method, the proposed method is compared with the traditional PLL when a step change disturbance occurs at the DC voltage reference as shown in FIG. 12. A better dynamic performance is obtained for the proposed synchronization technique. Actually, the DC controller of the active load could maintain the DC overvoltage to a certain limit. However, due to the negative impact of the active load synchronization on the microgrid dynamic performance, a synchronization method could affect the DC voltage performance as shown in FIG. 12. The synchronization unit usually provides the active load controllers with the microgrid voltage frequency/phase angle, which implies that dynamics and possible inaccuracies of the synchronization unit have a considerable impact on the controller performance, as described by S. Golestan, J. Guerrero, and J. Vasquez, "A PLL-Based Controller for Grid-Connected Power Converters," IEEE Transactions on Power Electronics, Vol. PP, Issue: 99, pp. 1-6, 2017.

Figure 13A:
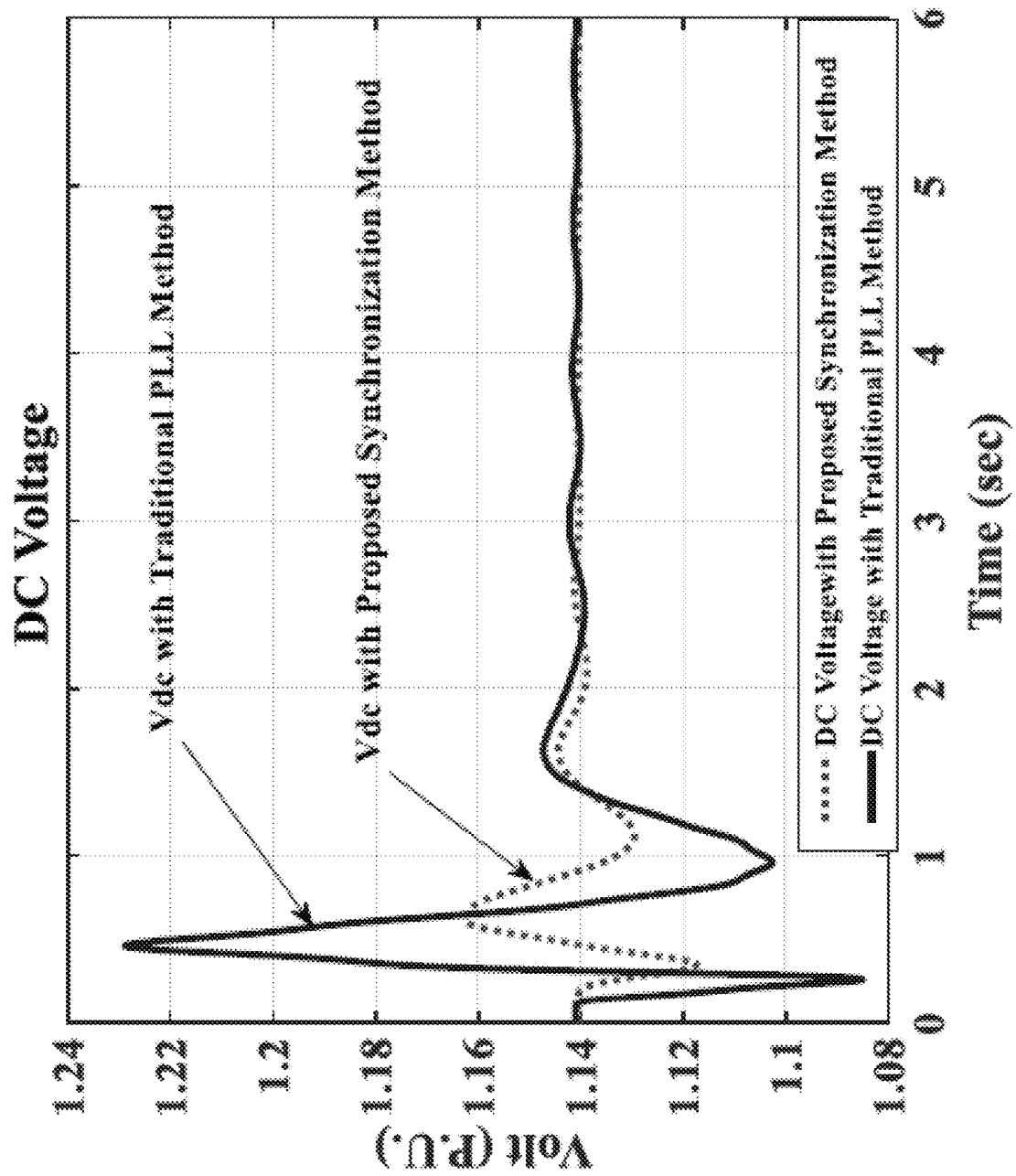
FIG. 13A shows a comparison of DC voltage response between the proposed synchronization method and the traditional PLL method when a three-phase fault occurs at the AC side of the active load bus.
Figure 13B:
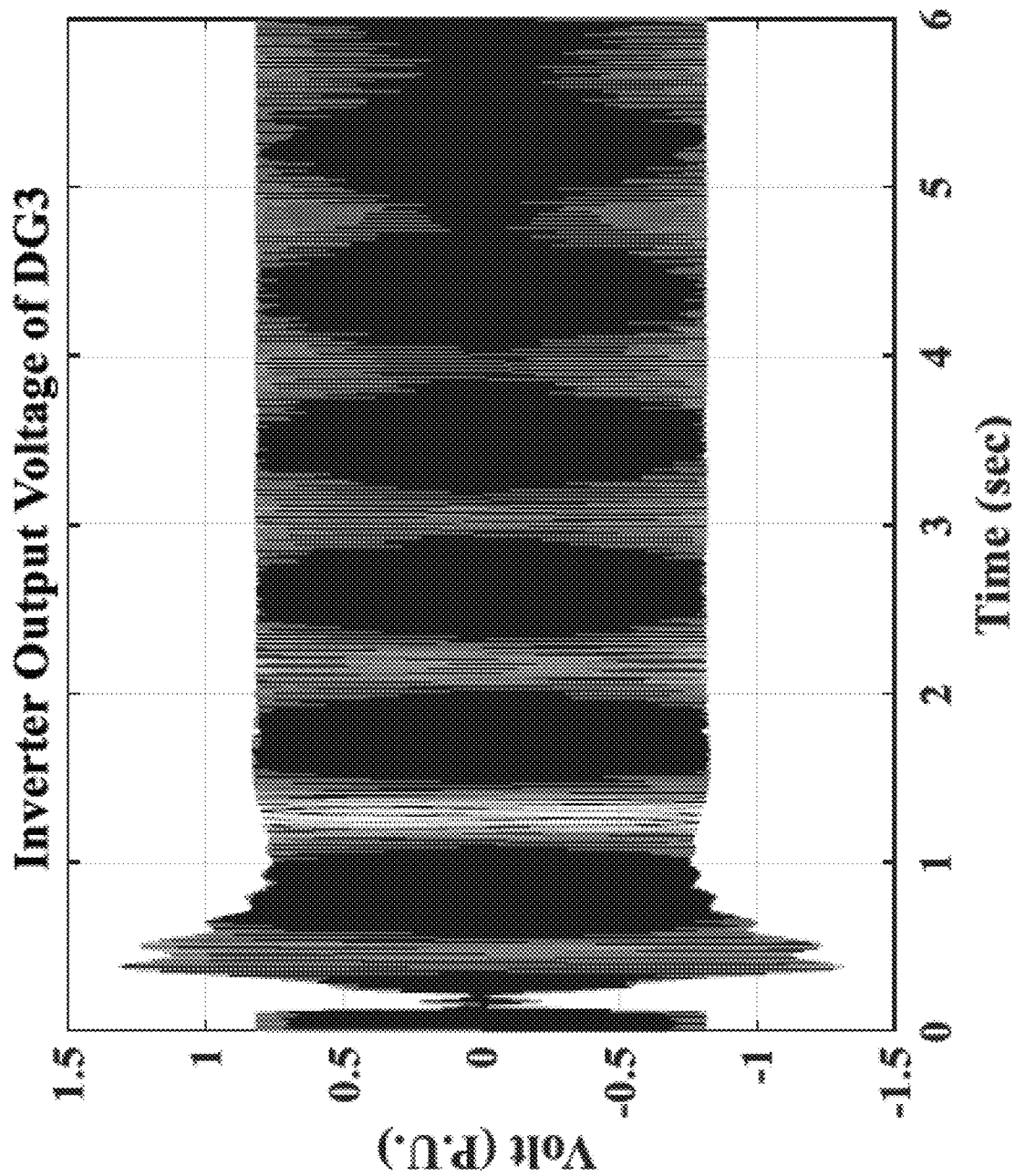
FIG. 13B shows the output voltage responses of the DG3 with the traditional PLL method when a three-phase fault occurs at the AC side of the active load bus.
Figure 13C:
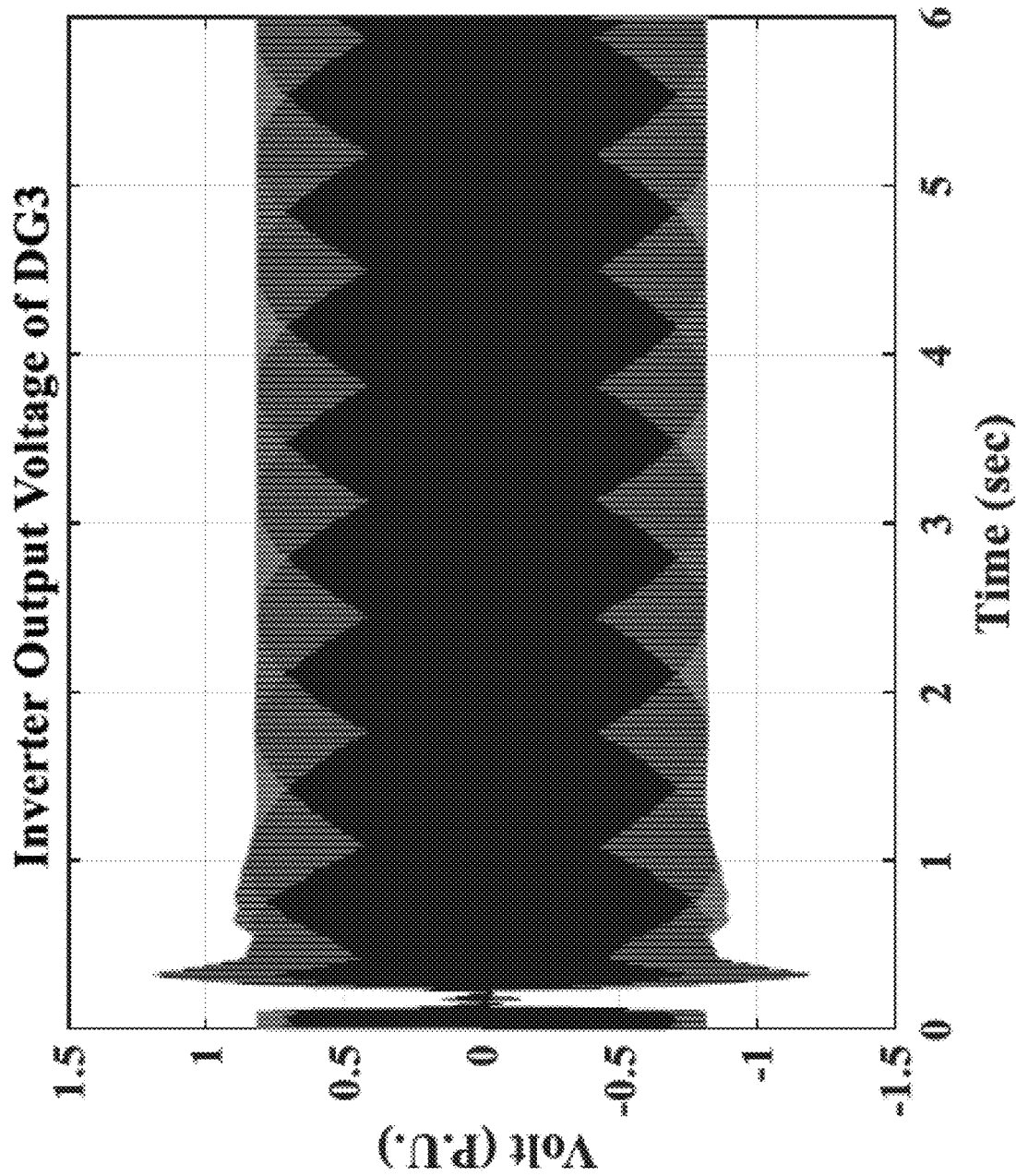
FIG. 13C shows the output voltage responses of the DG3 with the proposed synchronization method when a three-phase fault occurs at the AC side of the active load bus.
Figure 13D:
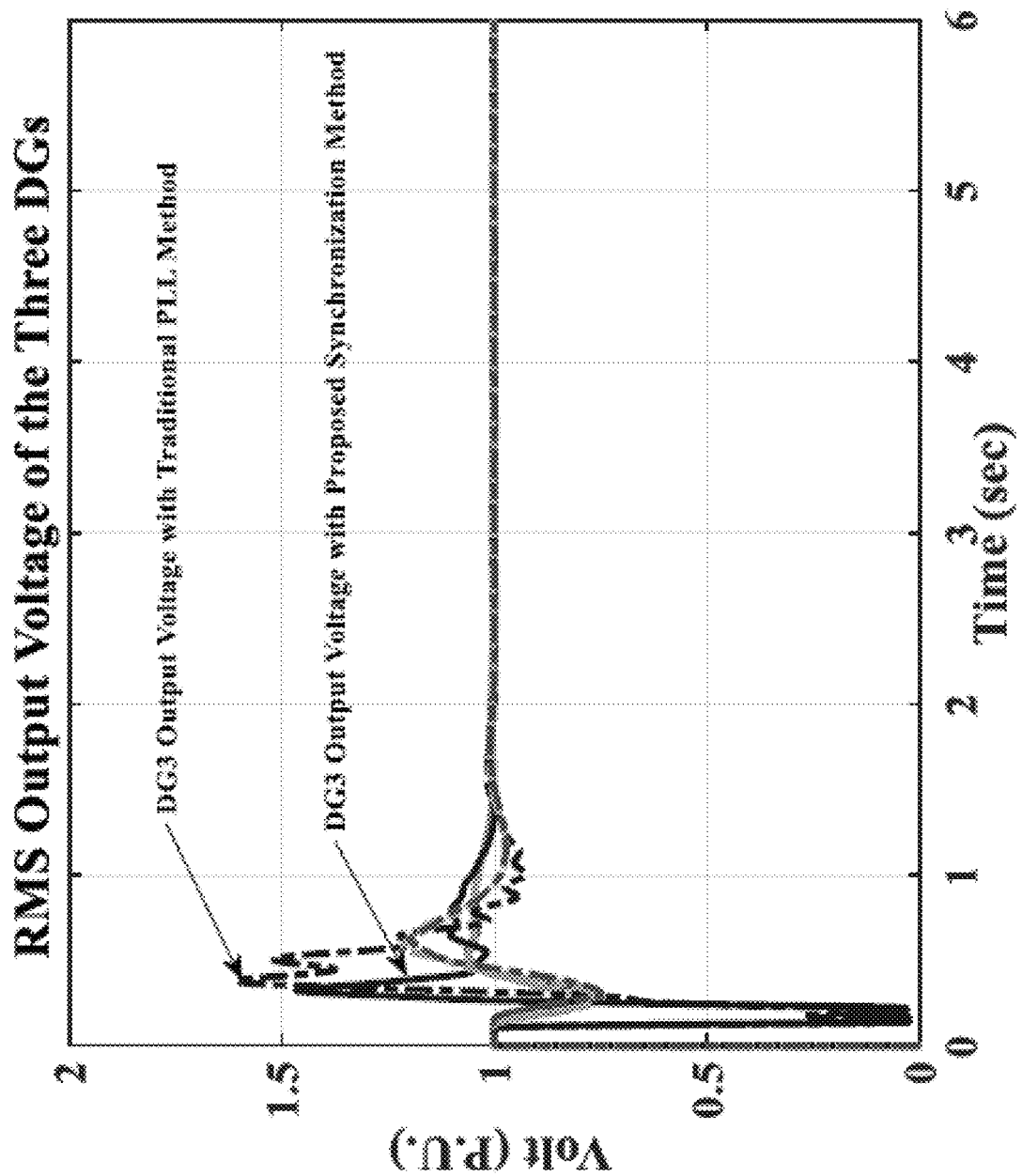
FIG. 13D shows a comparison of the RMS output inverter voltages of the DG3 between the traditional PLL method and the proposed synchronization method when a three-phase fault occurs at the AC side of the active load bus.

Meanwhile, to confirm that the proposed method performs better than the traditional PLL, a three-phase fault has been applied at the active load bus. FIG. 13A shows a comparison between the DC voltage responses of both methods for this disturbance. Additionally, FIGS. 13B-13C show the output voltage responses of the DG3 in both traditional PLL and proposed synchronization methods, respectively. FIG. 13D illustrates a comparison between the RMS output inverter voltages of the DG3 in both methods for this disturbance. It can be concluded from the given result that the proposed synchronization technique has a better dynamic performance than the response of the traditional PLL.

While the circuit topologies, the control strategies, and the methods illustrated above apply to synchronize an active load with a microgrid having a plurality of distributed generators, all of these can be adapted to synchronize multiple active loads with a microgrid having a plurality of distributed generators without deviating from the scope of the present disclosure.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be peach led in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

APPENDIX A: ACRONYMS AND NOMENCLATURES $v_{od}$, $v_{oq}$: dq components of the inverter output voltage $v_o$
$i_{od}$, $i_{oq}$: dq components of the inverter output current $i_o$
$P_m$, $Q_m$: instantaneous active and reactive powers of the DG inverter
$P_c$, $Q_c$: average active and reactive powers of the DG inverter
$m_p$, $n_q$: droop controller gains
$\theta$: phase reference
$\omega$: nominal frequency
$\omega_c$: cut-off frequency of the low-pass filter
$\omega_n$: nominal angular frequency of DG
$V_n$: nominal magnitude of the DG voltage
F: voltage controller feed-forward gain
$v^*_{od}$, $v^*_{oq}$: dq components of the reference output voltage
$i^*_{ld}$, $i^*_{lq}$: dq components of the filter inductor reference current
$v^*_{id}$, $v^*_{iq}$: dq components of the reference inverter voltage
$i_{ld}$, $i_{lq}$: dq components of the filter inductor current $i_L$
$v_{id}$, $v_{iq}$: dq components of the inverter voltage $v_i$
$C_f$, $L_f$, $R_f$: capacitance, inductance, and resistance of the LC filter
$L_c$, $R_c$: inductance and resistance of the coupling inductor
$C_{dc}$, $R_{dc}$: capacitance and resistance of the dc load of the active load
$\delta_i$: angle between the reference frame of each inverter (dq) and the common reference frame (DQ)
$\delta_{AL}$: angle between the reference frame of active load ($dq_{AL}$) and the common reference frame (DQ)
$i_{lineDQ}$: DQ components of the line current
$i_{loadDQ}$: DQ components of the load current
$v_{dc}$, $i_{dc}$: DC voltage and DC current of the active load respectively
$v^*_{DC}$: DC reference voltage of the active load
$i_{conv}$: DC side current of the active load
$v_{idqAL}$: dq components of the active load output voltage ($v_{iAL}$)
$i_{odqAL}$: dq components of the active load output current ($i_{oAL}$)
$i_{ldqAL}$: dq components of the input current to the bridge ($i_{LAL}$)
$k_{pv}$, $k_{iv}$: PI voltage controller parameters of the DG inverter
$k_{pc}$, $k_{ic}$: PI current controller parameters of the DG inverter
$k_{pv\_AL}$, $k_{iv\_A}$: PI controller parameters of the DC voltage of the active load
$k_{pc\_AL}$, $k_{ic\_AL}$: PI controller parameters of the AC current of the active load

What is claimed is:

1. A method for synchronizing an active load with a microgrid having a plurality of distributed generators, comprising:
   obtaining a dq reference frame for the active load and dq reference frames for each of the plurality of distributed generators,
   wherein each respective reference frame rotates at a respective angular frequency,
   selecting the dq reference frame of a first distributed generator as a common dq reference frame for the microgrid;
   determining a phase angle of a d component and a phase angle of a q component of the active load with respect to the common dq reference frame of the microgrid;
   determining a phase angle of each d component and a phase angle of each q component for each of the distributed generators of the plurality of distributed generators with respect to the common dq reference frame of the microgrid:
   determining controller parameters of a proportional integral controller of the active load and controller parameters of proportional integral controllers of each of the plurality of distributed generators by performing a particle swarm optimization to solve a weighted objective function of the active load and the plurality of distributed generators; and
   tuning the proportional integral controller parameters of the active load and the proportional integral controller parameters of each of the plurality of distributed generators based on the solution to the weighted objective function so that the phase angle of the d component and the phase angle of the q component of the active load and the phase angle of each d component and the phase angle of each q component for each of the distributed generators of the plurality of distributed generators are synchronized to the common dq reference frame;
   wherein the proportional integral controller gain parameters are adjusted based on at least one droop controller gain of the microgrid.

2. The method of claim 1, further comprising determining phase angles of d and q components of transmission lines and loads with respect to the common dq reference frame of the microgrid.

3. The method of claim 1, further comprising:
   starting random particles selection from a population;
   updating the particle inside the population by searching for an objective function; and
   obtaining an optimum particle when the objective function has a lowest output.

4. The method of claim 3, wherein the updating particle inside the population further comprises updating a velocity vector.

5. The method of claim 4, wherein the updated velocity vector depends on a current velocity, a distance between the particle and its personal best position, and a distance between the particle and a global best position.

6. The method of claim 1, wherein the proportional integral controller parameters of the active load and each of the distributed generators include controller gain parameters and power sharing parameters.

7. The method of claim 1, wherein the active load is a constant power load.

8. The method of claim 1, wherein the microgrid includes a constant impedance load.

* * * * *